United States Patent
Spencer, V

(10) Patent No.: US 8,633,835 B1
(45) Date of Patent: Jan. 21, 2014

(54) DISPLAY OF CLIMB CAPABILITY FOR AN AIRCRAFT BASED ON POTENTIAL STATES FOR THE AIRCRAFT

(75) Inventor: William F. Spencer, V, Dana Point, CA (US)

(73) Assignee: The Boeing Company, Chicago, IL (US)

( * ) Notice: Subject to any disclaimer, the term of this patent is extended or adjusted under 35 U.S.C. 154(b) by 206 days.

(21) Appl. No.: 13/217,773

(22) Filed: Aug. 25, 2011

Related U.S. Application Data

(63) Continuation-in-part of application No. 12/761,184, filed on Apr. 15, 2010, now Pat. No. 8,514,105.

(60) Provisional application No. 61/295,380, filed on Jan. 15, 2010.

(51) Int. Cl.
  *G01C 21/00* (2006.01)

(52) U.S. Cl.
  USPC ............................................ 340/977; 342/65

(58) Field of Classification Search
  USPC .................... 340/977, 970; 342/65; 701/4, 14
  See application file for complete search history.

(56) References Cited

U.S. PATENT DOCUMENTS

| | | | |
|---|---|---|---|
| 3,666,929 A | 5/1972 | Menn | |
| 4,224,669 A | 9/1980 | Brame | |
| 4,319,219 A | 3/1982 | Rein-Weston | |
| 4,758,839 A | 7/1988 | Goebel et al. | |
| 4,792,906 A | 12/1988 | King et al. | |
| 5,936,552 A | 8/1999 | Wichgers et al. | |
| 5,945,926 A | 8/1999 | Ammar et al. | |
| 6,085,129 A | 7/2000 | Schardt et al. | |
| 6,282,466 B1 | 8/2001 | Nolte et al. | |
| 6,469,640 B2 | 10/2002 | Wyatt | |
| 6,690,298 B1 | 2/2004 | Barber et al. | |
| 6,690,299 B1 | 2/2004 | Suiter | |
| 6,708,091 B2 | 3/2004 | Tsao | |
| 6,720,891 B2 | 4/2004 | Chen et al. | |
| 6,798,423 B2 | 9/2004 | Wilkins, Jr. et al. | |
| 6,879,886 B2 | 4/2005 | Wilkins, Jr. et al. | |
| 6,995,690 B1 | 2/2006 | Chen et al. | |
| 6,999,023 B2 | 2/2006 | Block | |
| 7,010,398 B2 | 3/2006 | Wilkins, Jr. et al. | |
| 7,188,007 B2 | 3/2007 | Boorman et al. | |
| 7,219,011 B1 | 5/2007 | Barber | |
| 7,346,437 B2 | 3/2008 | Petillon | |
| 7,433,781 B2 | 10/2008 | Bitar et al. | |
| 7,477,164 B1 | 1/2009 | Barber | |
| 7,634,335 B2 | 12/2009 | Bitar et al. | |
| 7,675,461 B1 | 3/2010 | McCusker et al. | |
| 7,903,000 B2 | 3/2011 | Hammack et al. | |

(Continued)

FOREIGN PATENT DOCUMENTS

EP 2360453 A1 8/2011

OTHER PUBLICATIONS

U.S. Appl. No. 13/015,215, filed Jan. 27, 2011, Spencer V et al.
U.S. Appl. No. 12/751,144, filed Mar. 31, 2010, Spencer V et al.

(Continued)

*Primary Examiner* — John A Tweel, Jr.
(74) *Attorney, Agent, or Firm* — Yee & Associates, P.C.

(57) ABSTRACT

A method and apparatus for presenting information to operate an aircraft over terrain. A vertical profile view of the terrain is displayed relative to a location of the aircraft. A number of curves are displayed on the vertical profile view. The number of curves identify a climb capability for the aircraft based on a potential state for the aircraft.

20 Claims, 14 Drawing Sheets

(56) References Cited

U.S. PATENT DOCUMENTS

| | | | |
|---|---|---|---|
| 7,962,254 | B2 | 6/2011 | Bouchet et al. |
| 8,145,365 | B2 | 3/2012 | Flotte et al. |
| 8,374,776 | B2 | 2/2013 | Spencer, V |
| 8,514,105 | B1 | 8/2013 | Spencer, V et al. |
| 2003/0006928 | A1 | 1/2003 | Szeto et al. |
| 2003/0184450 | A1 | 10/2003 | Muller et al. |
| 2003/0193410 | A1 | 10/2003 | Chen et al. |
| 2006/0005147 | A1 | 1/2006 | Hammack et al. |
| 2006/0161336 | A1 | 7/2006 | Wischmeyer |
| 2006/0250280 | A1 | 11/2006 | Chen et al. |
| 2007/0055418 | A1 | 3/2007 | Pire et al. |
| 2007/0164167 | A1 | 7/2007 | Bachelder et al. |
| 2007/0219705 | A1 | 9/2007 | Bitar et al. |
| 2008/0004801 | A1 | 1/2008 | Bitar et al. |
| 2008/0103643 | A1 | 5/2008 | Artini |
| 2008/0312781 | A1 | 12/2008 | Nikolic et al. |
| 2010/0030401 | A1 | 2/2010 | Rogers et al. |
| 2010/0265268 | A1 | 10/2010 | Wilson et al. |
| 2011/0196549 | A1 | 8/2011 | Sharkany et al. |

OTHER PUBLICATIONS

U.S. Appl. No. 12/761,184, filed Apr. 15, 2010, Spencer V et al.
European Search Report, dated May 25, 2011, regarding Application No. EP11153457.4, 6 pages.
Notice of Allowance, dated Jan. 2, 2013, regarding U.S. Appl. No. 12/761,184, 7 pages.
"T2CAS Product Description", Aviation Communication & Surveillance Systems, May 2003, pp. 1-15 www.L-3com.com/acss.
"Height-velocity diagram", Wikipedia, pp. 1-2, retrieved Aug. 30, 2010 http://en.wikipedia.org/wiki/Height-velocity_diagram.
File:Hvcurve.png, Wikipedia, pp. 1-3, retrieved Sep. 7, 2010 http://en.wikipedia.org.wikiFile:Hvcurve.png.
Office Action, dated Aug. 15, 2013, regarding USPTO U.S. Appl. No. 12/703,944, 23 pages.
Office Action, dated Jun. 19, 2013, regarding USPTO U.S. Appl. No. 13/015,215, 20 pages.

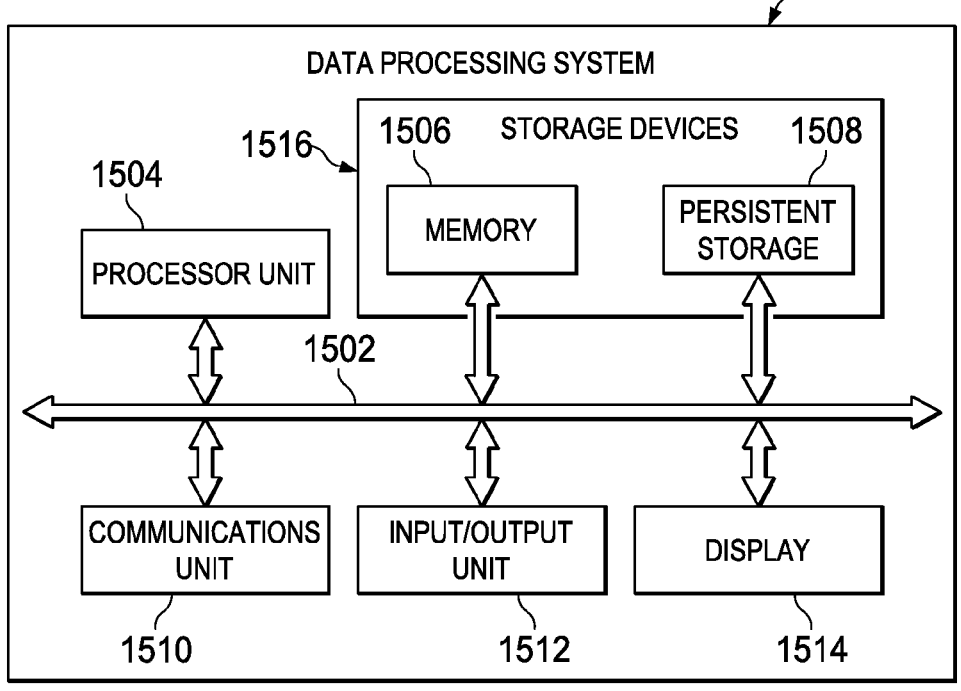
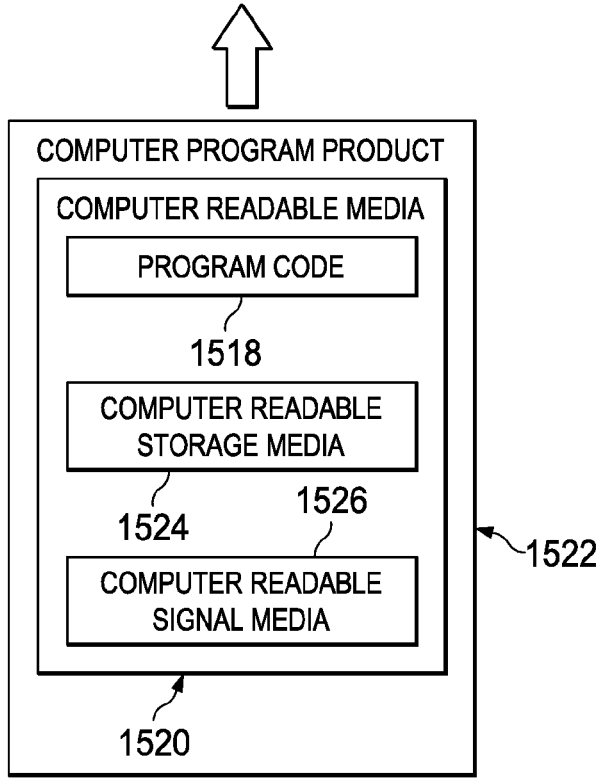
FIG. 15

DISPLAY OF CLIMB CAPABILITY FOR AN AIRCRAFT BASED ON POTENTIAL STATES FOR THE AIRCRAFT

CROSS-REFERENCE TO RELATED APPLICATION

This application is a continuation-in-part of patent application U.S. Ser. No. 12/761,184, filed Apr. 15, 2010, entitled "Aircraft Energy Management Display for Enhanced Vertical Situation Awareness", which is incorporated herein by reference, which claims the benefit of U.S. Provisional Application No. 61/295,380, filed Jan. 1, 2010.

BACKGROUND INFORMATION

1. Field

The present disclosure relates generally to aircraft and, in particular, to a method and apparatus for presenting information during flight of an aircraft. Still more particularly, the present disclosure relates to a method and apparatus for presenting information for vertical situation awareness that facilitates energy management in an aircraft.

2. Background

Different types of aircraft may fly close to or follow the terrain to perform different types of operations. For example, agricultural aircraft, such as crop dusters, fly at low altitudes over fields to apply pesticides to crops. Some types of passenger and freight aircraft fly close mountainous terrain to deliver passengers and/or cargo to high-elevation airports. Fire fighting air tankers fly close to the terrain to drop water or fire retardant onto or around a fire. Most helicopters fly near terrain throughout their flights.

Military aircraft may fly close to the terrain to drop cargo and paratroops or to avoid detection. The military aircraft may fly within a valley, behind a ridge, or close to some other terrain in a manner that may mask the military aircraft's signature in the ground clutter.

Some aircraft may use terrain following systems. A terrain following system is a guidance system that allows an aircraft to fly safely close to the ground. Further, with the terrain following system, the aircraft may fly safely over terrain, such as valleys or mountains. This type of system may allow an aircraft to fly at night or with no visibility.

Terrain following systems have been used in various military aircraft, such as bombers, fighters, and airlift aircraft. These terrain following systems offer an operator of an aircraft cues to steer the aircraft so as to maintain a desired height above the terrain. Terrain following systems use a display to provide these cues to the operator of the aircraft. These cues may be, for example, graphical indicators, text in windows, and/or other suitable types of cues.

Although a terrain following system may be used for different types of operations, these systems are expensive and require a greater amount of pilot training and practice than desired.

Other aircraft may not include a terrain following system that is designed to guide the pilot to maintain a substantially constant terrain clearance. Instead, these aircraft may have a warning system that is designed to prevent an accidental approach to terrain between takeoff and landing of an aircraft. These types of systems, however, may not be helpful in aiding a pilot intentionally flying close to the ground after takeoff and before landing.

Without a terrain following system, an aircraft may be grounded at night or in low visibility conditions. These conditions include, for example, rain, snow, and fog. Further, without a terrain following system, an aircraft may not be able to fly close enough to the terrain to perform certain types of operations. As one example, fire fighting air tankers are typically grounded at night.

Therefore, it would be advantageous to have a method and apparatus that takes into account one or more of the issues discussed above, as well as other possible issues.

SUMMARY

In one advantageous embodiment, a method is provided for presenting information to operate an aircraft over terrain. A vertical profile view of the terrain is displayed relative to a location of the aircraft. A number of curves are displayed on the vertical profile view. The number of curves identify a climb capability for the aircraft based on a potential state for the aircraft.

In another advantageous embodiment, a method for operating an aircraft over terrain is provided. A determination is made as to whether the aircraft is predicted to substantially maintain a desired height above the terrain during a flight of the aircraft using a vertical profile view of the terrain and a number of curves displayed on the vertical profile view. A number of maneuvers for operating the aircraft are selected based on the potential state for the aircraft and a current state for the aircraft when the aircraft is not predicted to substantially maintain the desired height above the terrain during the flight of the aircraft.

In yet another advantageous embodiment, an apparatus comprises a display device, a storage device, program code stored on the storage device, and a processor unit configured to run the program code. The processor unit is configured to run the program code to display a vertical profile view of terrain relative to a location of an aircraft. The processor unit is also configured to run the program code to display a number of curves on the vertical profile view. The number of curves identify a climb capability for the aircraft based on a potential state for the aircraft.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 15 is an illustration of a data processing system in accordance with an advantageous embodiment.

DETAILED DESCRIPTION

Figure 1:
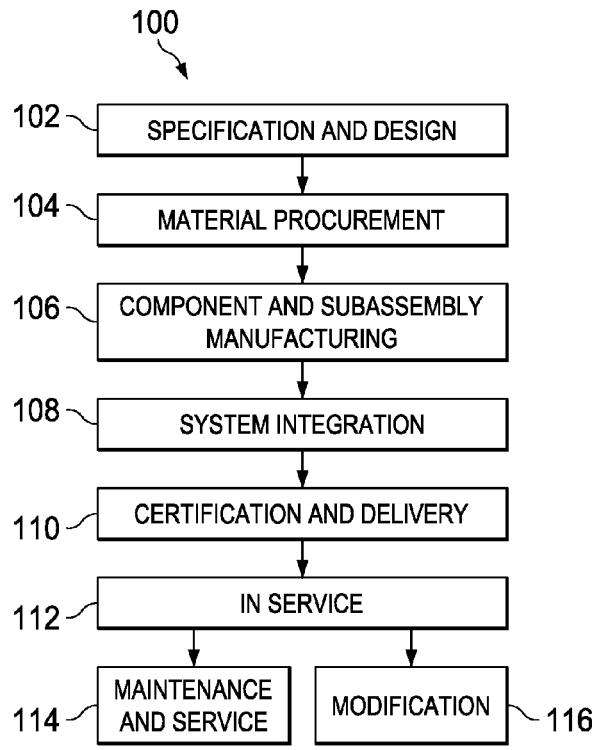
FIG. 1 is an illustration of an aircraft manufacturing and service method in accordance with an advantageous embodiment.
Figure 2:
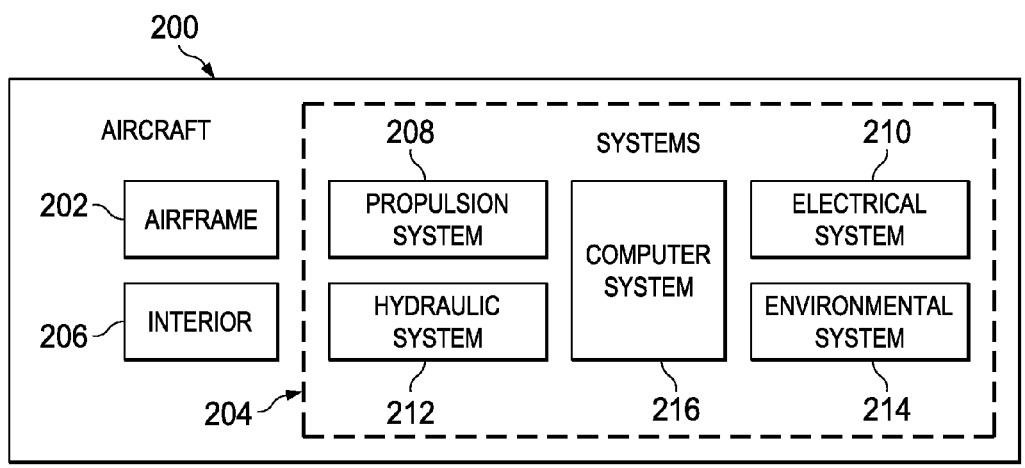
FIG. 2 is an illustration of an aircraft in which an advantageous embodiment may be implemented.

Referring more particularly to the drawings, embodiments of the disclosure may be described in the context of an aircraft manufacturing and service method 100 as shown in FIG. 1 and an aircraft 200 as shown in FIG. 2. Turning first to FIG. 1, an illustration of an aircraft manufacturing and service method is depicted in accordance with an advantageous embodiment. During pre-production, the aircraft manufacturing and service method 100 may include a specification and design 102 of the aircraft 200 in FIG. 2 and a material procurement 104.

During production, component and subassembly manufacturing 106 and system integration 108 of the aircraft 200 in FIG. 2 takes place. Thereafter, the aircraft 200 in FIG. 2 may go through certification and delivery 110 in order to be placed in service 112. While in service 112 by a customer, the aircraft 200 in FIG. 2 is scheduled for routine maintenance and service 114. While in service 112 by a customer, the aircraft 200 may also be scheduled for modification 116. In this illustrative example, modification 116 may include modification, reconfiguration, refurbishment, improvements, and/or other types of modifications.

Each of the processes of the aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, the aircraft 200 is produced by the aircraft manufacturing and service method 100 in FIG. 1 and may include an airframe 202 with a plurality of systems 204 and an interior 206. Examples of the systems 204 include one or more of a propulsion system 208, an electrical system 210, a hydraulic system 212, an environmental system 214, and a computer system 216. Any number of other systems may be included. Although an aerospace example is shown, different advantageous embodiments may be applied to other industries, such as, for example, without limitation, the submarine or spacecraft industry.

Apparatus and methods embodied herein may be employed during at least one of the stages of the aircraft manufacturing and service method 100 in FIG. 1. In the different illustrative examples, one or more advantageous embodiments may be implemented in the computer system 216 during one or more stages of the aircraft manufacturing and service method 100.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while the aircraft 200 is in maintenance and service 114 and modification 116 in FIG. 1.

As yet another illustrative example, a number of apparatus embodiments, method embodiments, or a combination thereof may be utilized while the aircraft 200 is in service 112 in FIG. 1. As yet another example, a number of apparatus embodiments, method embodiments, or a combination thereof may be fabricated or manufactured and installed into the aircraft 200 during modification 116 in FIG. 1.

A number, when referring to items, means one or more items. For example, a number of apparatus embodiments may be one or more apparatus embodiments. The use of a number of the different advantageous embodiments may increase the utility of the aircraft 200 and the safety of operation of the aircraft 200.

The different advantageous embodiments recognize and take into account a number of different considerations as discussed below. For example, the different advantageous embodiments recognize and take into account that other types of systems may be used in addition to a terrain following system to provide pilots an awareness of their vertical situation on a continual basis during the flight of the aircraft.

The different advantageous embodiments recognize and take into account that one manner in which pilots may take into account their vertical situation awareness is to use a global positioning system receiver, a display of a map, and/or stored terrain data. This type of system, however, requires increased pilot workload and also may require a pilot to have increased margins in their climbs to ensure safety. Flying with increased margins may involve, for example, without limitation, climbing sooner, descending later, and/or flying higher.

The different advantageous embodiments recognize and take into account that different types of aircraft may have different climb capabilities. For example, identifying the climb capability for an aircraft with respect to a terrain may require extensive pilot experience and training. This identification of the climb capability may include identifying when to start a climb or stop a descent. Further, the different advantageous embodiments recognize and take into account that as the weight of the aircraft changes during flight, the climb capability of an aircraft changes. For example, if cargo is deployed from the aircraft and/or when fuel is used, the climb capability of an aircraft changes.

As a result, the different advantageous embodiments recognize and take into account that even with the use of global positioning system receivers, displays of maps, and stored terrain data, many aircraft may be unable to fly at low altitudes at night. This situation may occur because of a lack of precise knowledge of the energy state of an aircraft with respect to the terrain over which the aircraft is flying. For example, a pilot of an aircraft may not have the knowledge needed to safely clear the terrain through climbs and descents when flying at low altitudes at night.

Thus, the different advantageous embodiments provide a method and apparatus for presenting pilots with an awareness of their vertical situation. The information may be provided on a continual basis to show a comparison of the energy state and climb capability of the aircraft with respect to terrain that is below and ahead of the aircraft. The different advantageous embodiments may be implemented in existing guidance systems. For example, one or more advantageous embodiments may be included in a terrain following system. In yet other advantageous embodiments, the information may be provided using additional systems.

In one or more advantageous embodiments, a method and apparatus are present for presenting data with an energy state of an aircraft. This energy state may be presented in the form of information identifying climb capabilities of an aircraft relative to the terrain below and in front of the aircraft. This information may be used to permit an operator of an aircraft to perform operations to safely climb and clear terrain. Further, this information may be used to permit an operator of an aircraft to perform operations to climb and clear terrain with a desired precision.

Additionally, the different advantageous embodiments take into account and recognize that during the flight of an aircraft, an unplanned event may occur that changes the climb capabilities for the aircraft. An unplanned event may be, for example, without limitation, an unexpected event, an event not indicated in a flight plan for the aircraft, or some other suitable type of unplanned event. For example, a condition of the aircraft may change during the flight of the aircraft. This change in the condition of the aircraft may be an unplanned change and may affect the terrain the aircraft can clear during climbs and/or descents.

The different advantageous embodiments recognize and take into account that information about potential states for the aircraft that may occur in response to unplanned events may be useful to a pilot of an aircraft during flight. In particular, information about how these potential states for the aircraft may affect the climb capabilities of the aircraft may provide a pilot of the aircraft with an increased level of awareness of the vertical situation of the aircraft.

Thus, the different advantageous embodiments provide a method and apparatus for presenting information to operate an aircraft over terrain. In particular, the different advantageous embodiments provide a system for presenting information about the climb capabilities of an aircraft to a pilot of the aircraft during flight with respect to potential states for the aircraft.

In one advantageous embodiment, a method is present for presenting information to operate an aircraft over terrain. A vertical profile view of the terrain is displayed relative to a location of the aircraft. A number of curves may be displayed on the vertical profile view. The number of curves identify a climb capability for the aircraft based on a potential state for the aircraft.

Figure 3:
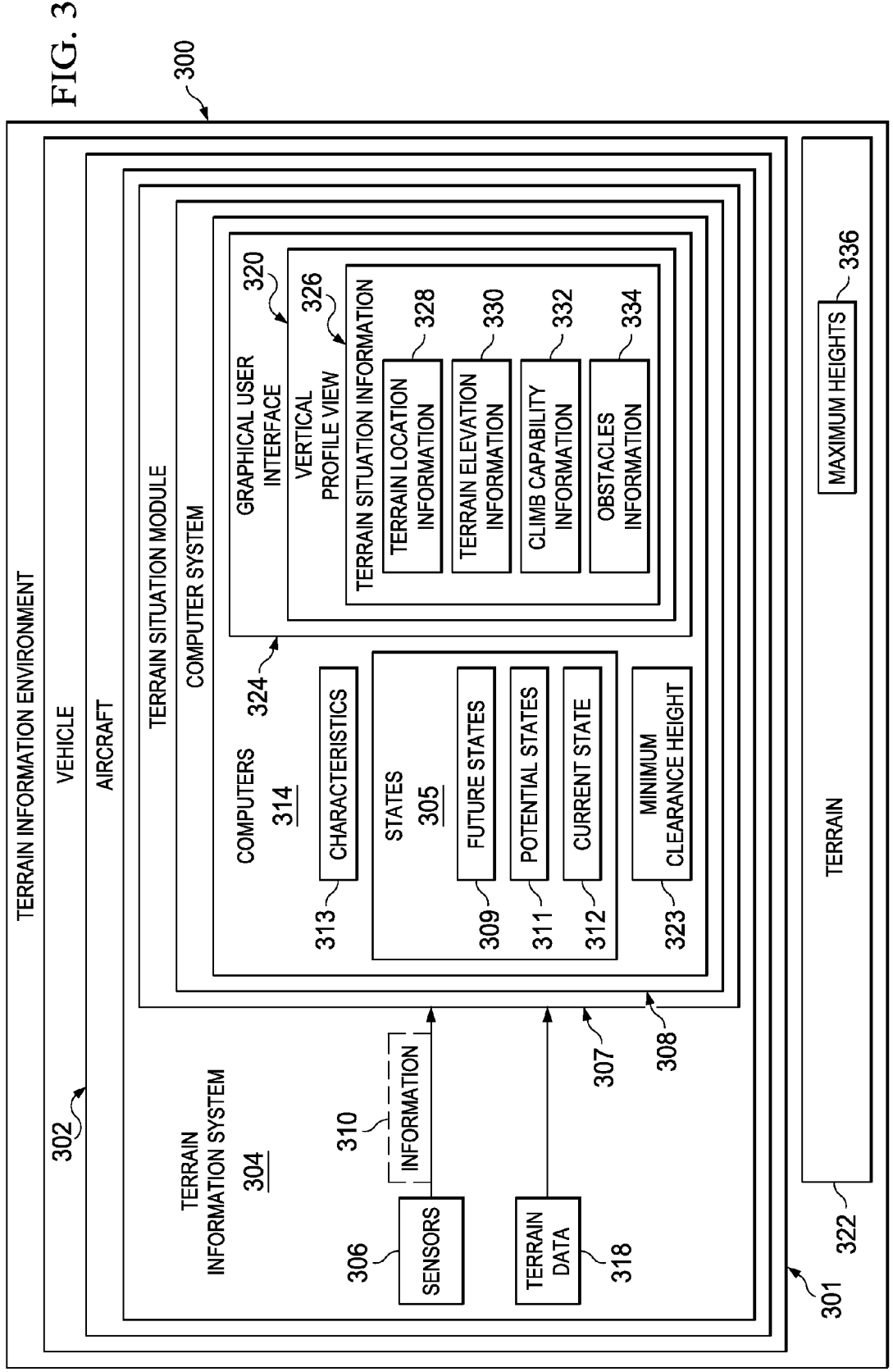
FIG. 3 is an illustration of a terrain information environment in accordance with an advantageous embodiment.

Turning now to FIG. 3, an illustration of a terrain information environment is depicted in accordance with an advantageous embodiment. In this illustrative example, a terrain information environment 300 includes a vehicle 301. The vehicle 301 may be an aircraft 302, which may be implemented using the aircraft 200 in FIG. 2.

In this illustrative example, the aircraft 302 includes a terrain information system 304. The terrain information system 304 includes a number of sensors 306 and a terrain situation module 307. The sensors 306 and the terrain situation module 307 are associated with the aircraft 302. The terrain situation module 307 may be implemented using hardware, software, or a combination of the two. In these illustrative examples, the terrain situation module 307 may be implemented using a computer system 308.

As depicted, the computer system 308 comprises a number of computers 314. When two or more of the computers 314 are present in the computer system 308, these computers may be in communication with each other using a communications fabric, such as a network.

The terrain situation module 307 identifies a number of states 305 for the aircraft 302. These states 305 may include, for example, a current state 312, future states 309, and potential states 311 of the aircraft 302. As one illustrative example, the current state 312 of the aircraft 302 may be identified using, for example, information 310 generated by the sensors 306 in the terrain information system 304.

As depicted in these examples, the information 310 sent to the terrain situation module 307 for processing by the number of computers 314 may include, for example, without limitation, at least one of an aircraft condition, an aircraft position, an aircraft movement, an aircraft system status, atmospheric measurements, and/or other suitable information.

An aircraft condition may include, without limitation, gross weight, flap position, landing gear position, and door position. An aircraft position may include, without limitation, a location of the aircraft 302 in three-dimensional space, altitude, attitude, heading, pitch angle, and roll angle. An aircraft movement may include, without limitation, airspeed, ground speed, vertical velocity, vertical acceleration, pitch rate, ground track angle, and turn rate.

Further, an aircraft system status may include, for example, without limitation, engine power. Engine power is the torque of the engine of the aircraft 302 multiplied by the engine speed of the aircraft 302. Atmospheric measurements may include, without limitation, air pressure, air density, air temperature, wind speed, and wind direction.

Additionally, the information 310 may include, for example, without limitation, pilot settings, such as reaction or warning time, pull-up and pushover acceleration, target speed, and climb angle limit.

Further, the information 310 also may be used in identifying the future states 309 of the aircraft 302. A future state of the aircraft 302 is a state of the aircraft 302 at a point in time that has not yet occurred.

The future states 309 of the aircraft 302 may be based on at least one of the current state 312 of the aircraft 302, a flight plan for the aircraft 302, user input, and other suitable factors. For example, the user input may include a pilot setting, such as a future groundspeed, future altitude, future bank angle, future gross weight, and/or some other suitable setting.

In these illustrative examples, the terrain situation module 307 may use characteristics 313 for the aircraft 302 to identify the current state 312 of the aircraft 302. These characteristics 313 may include, for example, without limitation, aircraft stall speed for given gross weights and flap positions, aircraft drag characteristics for aircraft configuration variations, yawing moment due to an engine out, engine power available for given airspeeds, air densities, air temperatures, and/or other suitable characteristics for the aircraft 302. Aircraft configuration variations include, for example, positions for landing gear, flaps, and doors. In these illustrative examples, the terrain situation module 307 may also use characteristics 313 for the aircraft 302 to identify the future states 309 of the aircraft 302.

In these illustrative examples, the terrain situation module 307 uses both the current state 312 of the aircraft 302 and terrain data 318 to create a vertical profile view 320 of terrain 322 over which the aircraft 302 is flying and the terrain 322 that is ahead of the aircraft 302.

The terrain data 318 is stored terrain data in these illustrative examples. For example, the terrain data 318 may be stored in a database. In other illustrative examples, the terrain data 318 may be obtained from at least one of the sensors 306 on the aircraft 302. For example, the terrain data 318 may be obtained from a radar sensor.

The terrain data 318 includes data about the elevation of the terrain 322. The terrain data 318 also may include the identification of different features of the terrain 322. For example, the terrain data 318 may include information identifying mountains, hills, valleys, cliffs, plateaus, and/or other suitable features of the terrain 322.

In some cases, the terrain data 318 may include an identification of different geographical boundaries, such as countries, states, cities, counties, airspace, and/or other suitable information. Airspace may include, for example, without limitation, restricted airspace, terminal airspace, military operations airspace, and/or other suitable types of airspace.

The terrain data 318 also includes information about obstacles to the flight of the aircraft 302. Obstacles are man-made objects in these illustrative examples. These obstacles may include, for example, without limitation, power lines, buildings, radio frequency towers, and other obstacles.

The terrain situation module 307 displays the vertical profile view 320 on a graphical user interface 324 within the computer system 308. This vertical profile view 320 provides terrain situation information 326 for use by an operator of the aircraft 302. For example, the terrain situation information 326 provides an operator of the aircraft 302 with information about the aircraft 302 relative to the terrain 322.

The terrain situation information 326 may take a number of different forms. For example, the terrain situation information 326 may take the form of, for example, icons, curves, text, or other types of information displayed on the vertical profile view 320. Further, in some cases, the terrain situation information 326 may be presented audibly in addition to or in place of being displayed on the graphical user interface 324.

In these illustrative examples, the terrain situation information 326 includes at least one of terrain elevation information 330, terrain location information 328, climb capability information 332 for the aircraft 302, obstacles information 334, and other suitable information. The obstacles information 334 includes information about obstacles, such as man-made structures that may be on the terrain 322.

The terrain elevation information 330 may include, for example, without limitation, an identification of the type of terrain 322 or an identification of the elevation of the terrain 322 with respect to the aircraft 302. In these examples, the terrain elevation information 330 may be in the form of an outline or shapes displayed relative to the aircraft on the vertical profile view 320.

The terrain location information 328 includes an identification of a number of particular locations of the terrain 322 at different points or locations on the vertical profile view 320. For example, the terrain location information 328 may be an identification of the height of a portion of the elevation of the terrain 322. For example, the terrain location information 328 may identify a top of a mountain in the terrain 322.

The climb capability information 332 includes information about the ability of the aircraft 302 to climb to higher altitudes over a distance. In the context of the terrain situation information 326 on the vertical profile view 320, the climb capability information 332 provides information about the ability of the aircraft 302 to climb with respect to the elevation of the terrain 322 and any obstacles that may be present.

With the terrain situation information 326, an operator of the aircraft 302 can identify a number of maximum heights 336 of the terrain 322 that the aircraft 302 can clear based on the current state 312 of the aircraft 302. The maximum heights 336 that can be cleared by the aircraft 302 change as the terrain elevation information 330 changes.

In these illustrative examples, the maximum heights 336 of the terrain 322 that can be cleared by the aircraft 302 are the maximum terrain heights over which the aircraft 302 can climb while maintaining a minimum clearance height 323 over the terrain 322. In these illustrative examples, the minimum clearance height 323 is a selected height of the aircraft 302 above the terrain 322. For example, the minimum clearance height 323 may be a minimum height above the terrain 322 that the aircraft 302 is to maintain while flying over the terrain 322. The minimum clearance height 323 may be selected based on a number of rules, policies, safety requirements, pilot setting, and/or other suitable factors.

In these illustrative examples, the minimum clearance height 323 may be displayed on the vertical profile view 320 as a minimum terrain clearance distance. With the terrain situation information 326, an operator of the aircraft 302 may be able to more easily identify information with respect to the location of the aircraft 302 relative to the terrain 322. Further, an operator may be more easily able to identify changes in the operation of the aircraft 302 that may allow the aircraft 302 to fly over the terrain 322 in a desired manner.

In these illustrative examples, the climb capability information 332 provided by the terrain situation information 326 on the vertical profile view 320 is information that may provide the operator an ability to manage the energy of the aircraft 302, change engine power, or perform other maneuvers. These maneuvers may be performed with respect to the capability of the aircraft 302 to climb based on the current state 312 of the aircraft 302.

For example, the aircraft 302 has an energy based on the current state 312 of the aircraft 302. The terrain situation information 326 provides the operator with an ability, given the energy of the aircraft 302, to select a time or location to initiate climbs to safely clear the elevation of the terrain 322.

Also, with the terrain situation information 326, an operator may have information that may allow the operator to fly in conditions, such as darkness, fog, and/or other situations that may obscure visibility of the terrain 322.

Additionally, the terrain situation information 326 also provides an operator of the aircraft 302 with the climb capability information 332 for the aircraft 302 with respect to the potential states 311 of the aircraft 302. The potential states 311 of the aircraft 302 may be states of the aircraft 302 that are not planned based on at least one of the current state 312 of the aircraft 302, currently planned operations of the aircraft 302, a current environment around the aircraft 302, a flight plan for the aircraft 302, and other suitable factors.

In other words, a potential state of the aircraft 302 is a state of the aircraft 302 that may occur in response to an unplanned event occurring during the flight of the aircraft 302. The unplanned event may comprise, for example, at least one of a change in operation of the aircraft 302, a change in a flight plan, a change in location, heading, or ground track, dropping cargo at an unplanned location, not dropping cargo at a planned location, an unplanned change in a configuration for control surfaces for the aircraft 302, a loss of an engine, and/or some other suitable type of unplanned event or change in the condition for the aircraft 302.

Additionally, a potential state of the aircraft 302 may be based on an uncertainty of one or more future states 309 of the aircraft 302. In this manner, climb capability information 332 may be generated based on the current state 312, the future states 309, and/or the potential states 311 of the aircraft 302.

The manner in which the terrain situation information 326 is generated and presented is described in more detail with respect to the figures described below.

The illustration of the terrain information environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, a portion or all of the terrain situation module 307 may be located in other locations other than on the aircraft 302. For example, the terrain situation module 307 may be located in a remote computer system on another aircraft or on the ground.

Further, although this illustrative example is depicted with respect to the aircraft 302, other advantageous embodiments may be implemented using other types of platforms. For example, the vehicle 301 may take the form of an airplane, a helicopter, an unmanned aircraft system, a submarine, an unmanned underwater vehicle, a spacecraft, and/or some other suitable type of vehicle.

As one illustrative example, when implemented for an unmanned vehicle, such as, for example, without limitation, an unmanned aircraft system, an unmanned underwater vehicle, or an unmanned spacecraft; the graphical user interface 324 may be located in a remote computer system used by a remote pilot or operator.

Figure 4:
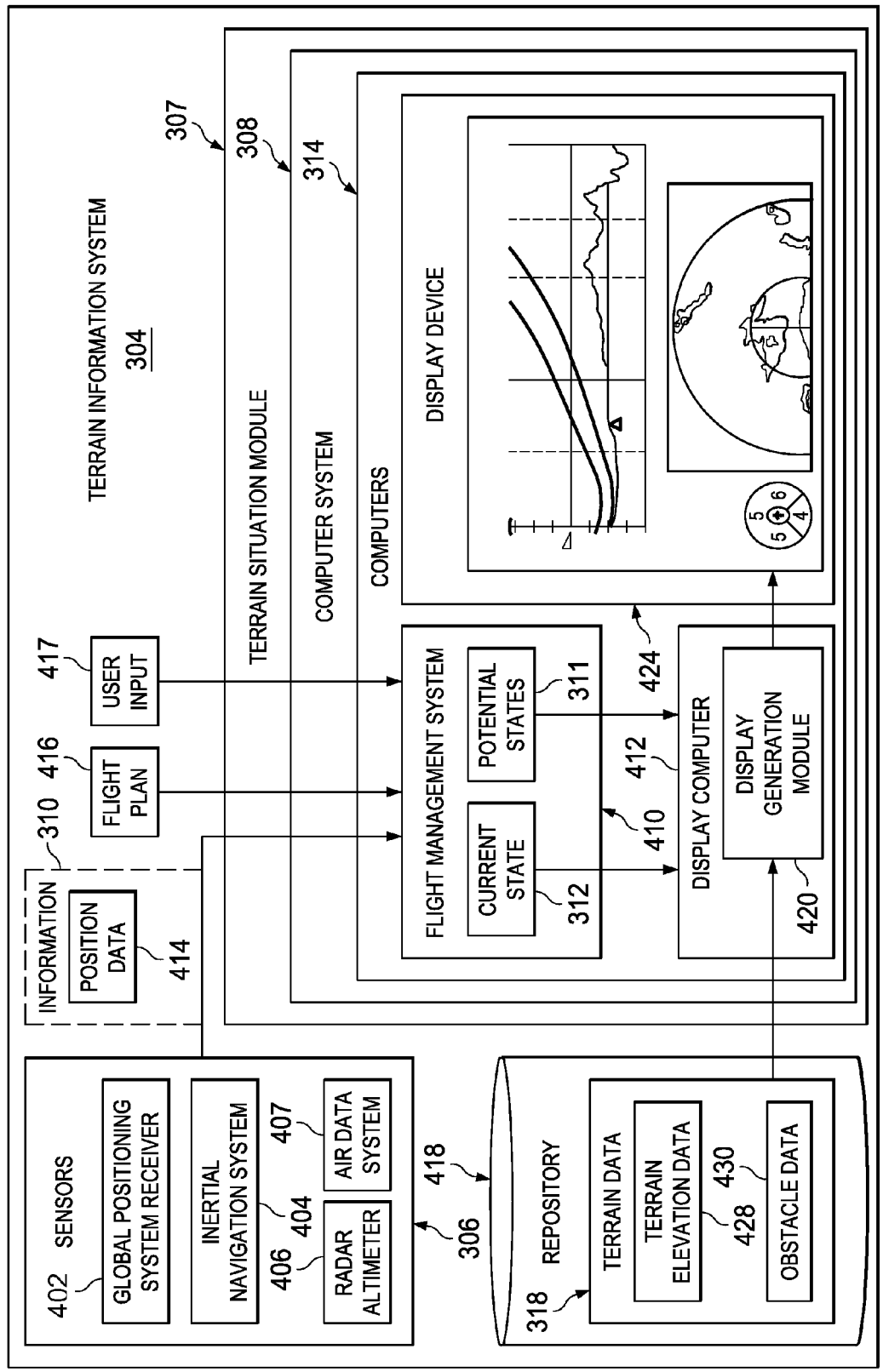
FIG. 4 is an illustration of a terrain information system in accordance with an advantageous embodiment.

With reference now to FIG. 4, an illustration of a terrain information system is depicted in accordance with an advantageous embodiment. In this illustrative example, the terrain information system 304 from FIG. 3 is depicted in more detail.

As depicted, the sensors 306 in the terrain information system 304 may include, for example, without limitation, a global positioning system receiver 402, an inertial navigation system 404, a radar altimeter 406, and an air data system 407. The sensors 306 send the information 310 to a flight management system 410 in the computer system 308.

The flight management system 410 is one of the number of computers 314 in the computer system 308 in this illustrative example. In particular, in this example, the sensors 306 send the information 310 in the form of position data 414 to the flight management system 410.

The position data 414 provides the current position of the aircraft 302 from FIG. 3. The position data 414 may include, for example, longitude, latitude, altitude above mean sea level, altitude above the terrain 322 from FIG. 3, a timestamp, and/or other suitable types of position information. Additionally, the position data 414, in some examples, also may include a speed, a climb angle, a turn rate, and/or other suitable types of information.

Further, the flight management system 410 receives a flight plan 416 and user input 417 in addition to the position data 414 received from the sensors 306. The flight plan 416 is information about the route that the aircraft 302 uses for a flight from a start location to an end location. In these illustrative examples, the user input 417 includes information that may be input into the flight management system 410 by an operator of the aircraft 302. For example, a pilot or other crew member of the aircraft 302 may enter a gross weight of the aircraft 302, changes to the flight plan 416, and/or other information.

The flight management system 410 uses the position data 414, the flight plan 416, and/or the user input 417 to identify the current state 312 of the aircraft 302. The current state 312 is sent to a display computer 412 in the computer system 308. The display computer 412 is another example of a computer in the computers 314 in the computer system 308.

Further, in some cases, the flight management system 410 may also identify the potential states 311 for the aircraft 302 using the position data 414, the flight plan 416, the user input 417, and/or other suitable types of information. The potential states 311 of the aircraft 302 also may be sent to the display computer 412.

In this illustrative example, a display generation module 420 is implemented in the display computer 412. The display generation module 420 is configured to generate the graphical user interface 324 from FIG. 3 for display on a display device 424. The display device 424 may be located on the aircraft 302 or in a remote location to the aircraft 302, such as at a control station.

The display generation module 420 generates the terrain situation information 326 in FIG. 3 for display in the graphical user interface 324 using at least one of the terrain data 318, the current state 312 of the aircraft 302, and the potential states 311 of the aircraft 302.

In this illustrative example, the terrain data 318 may be stored in a repository 418. The repository 418 may comprise any number of databases, data structures, files, documents, reports, charts, graphs, maps, and/or other suitable types of data structures for the terrain data 318. The repository 418 may be located in the computer system 308, in a computer remote to the computer system 308, or in some other suitable location.

In this illustrative example, the terrain data 318 includes terrain elevation data 428 and obstacle data 430. The terrain elevation data 428 includes elevation information for the terrain 322. In these examples, the terrain elevation data 428 is for naturally occurring terrain. The obstacle data 430 provides information about manmade objects that may be present. These manmade objects may include, for example, without limitation, radio towers, buildings, power lines, and other suitable types of obstacles.

The terrain elevation data 428 and the obstacle data 430 may be used to display the terrain elevation information 330 and the obstacles information 334 from FIG. 3 on the graphical user interface 324.

Figure 5:
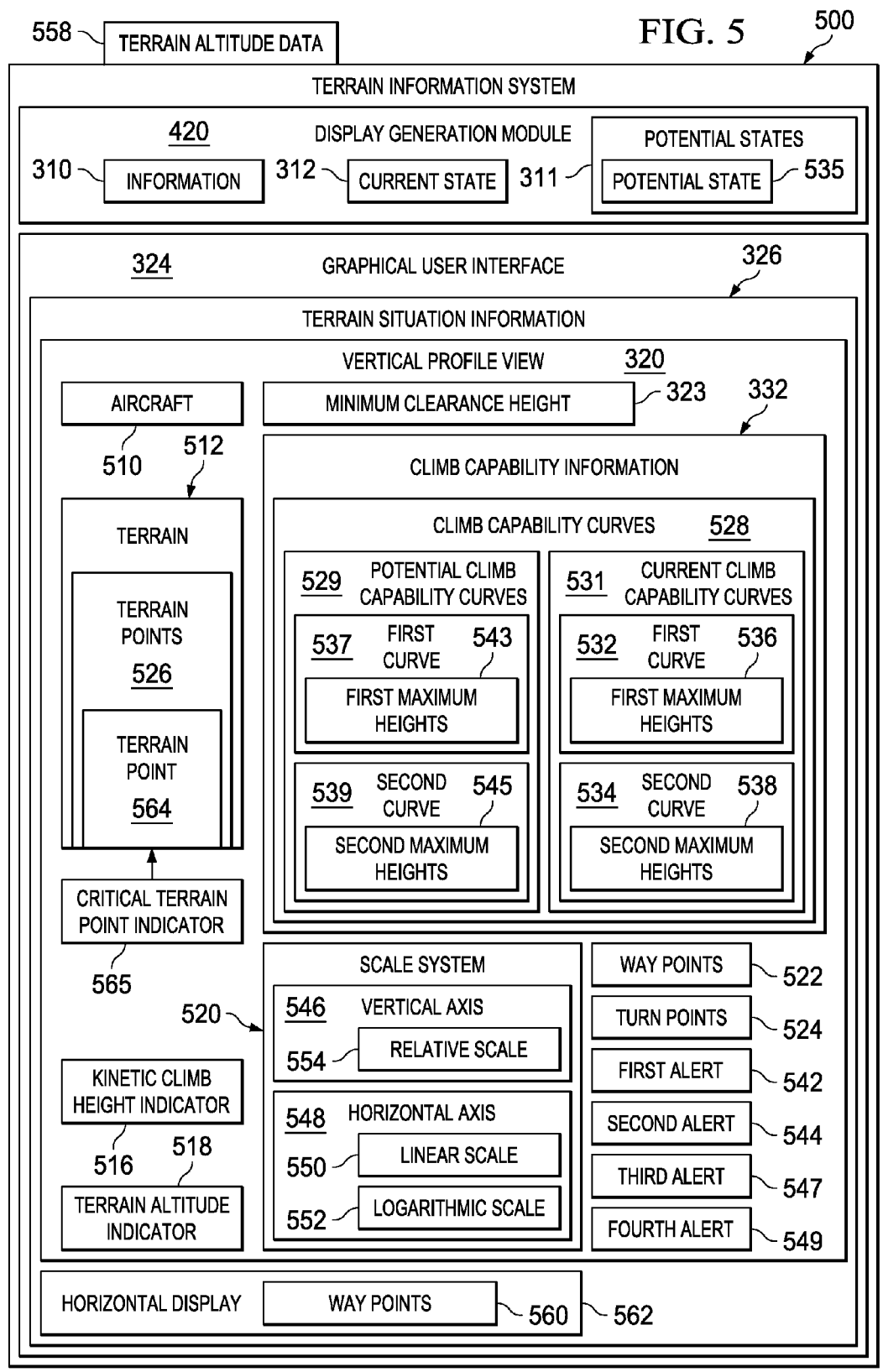
FIG. 5 is an illustration of a graphical user interface generated by a display generation module in accordance with an advantageous embodiment.

With reference now to FIG. 5, an illustration of a graphical user interface generated by a display generation module is depicted in accordance with an advantageous embodiment. In this illustrative example, the graphical user interface 324 generated by the terrain situation module 307 in FIG. 3, and, in particular, the display generation module 420 in FIG. 4, is depicted in more detail. As depicted, the graphical user interface 324 is generated for the display of terrain situation information 326.

The terrain situation information 326 is displayed as a vertical profile view 320 on the graphical user interface 324. As depicted, the vertical profile view 320 includes an aircraft 510. The aircraft 510 is an icon representing the actual aircraft 302 from FIG. 3. The aircraft 510 is displayed in the vertical profile view 320 in a position relative to a terrain 512 in the vertical profile view 320. The terrain 512 in the vertical profile view 320 is a representation of the actual terrain 322 in FIG. 3 over which the actual aircraft 302 flies. In this manner, the position of the aircraft 510 relative to the terrain 512 in the vertical profile view 320 represents the position of the actual aircraft 302 relative to the actual terrain 322.

Additionally, the terrain situation information 326 also includes a presentation of at least one of the climb capability information 332, a kinetic climb height indicator 516, a terrain altitude indicator 518, a scale system 520, a number of way points 522, a number of turn points 524, a number of terrain points 526, and other suitable information. In these examples, each of the terrain points 526 is a different location in the terrain 512. In other words, the terrain points 526 form the terrain location information 328 from FIG. 3.

In the illustrative examples, the climb capability information 332 is displayed in the vertical profile view 320 as a number of curves. In the illustrative examples, these curves are a number of climb capability curves 528. The climb capability curves 528 indicate the climb capability of the aircraft 302 with respect to at least one of the current state 312 of the aircraft 302 and the number of potential states 311 of the aircraft 302.

The climb capability curves 528 provide information about the maximum heights 336 from FIG. 3 of the terrain 322 over which the aircraft 302 can clear the terrain 322 in a desired manner. The maximum heights 336, which can be cleared by the aircraft 302, change as a function of the distance between the terrain 322 and the aircraft 302. In other words, the maximum heights 336 that can be cleared change as the terrain 322 changes.

As illustrated, the climb capability curves 528 include a number of current climb capability curves 531 and a number of potential climb capability curves 529. The current climb capability curves 531 are generated using the current state 312 of the aircraft 302 received from the flight management system 410. In this manner, the current climb capability curves 531 identify the current climb capability of the aircraft 302 while the aircraft 302 is in the current state 312.

In these depicted examples, the current climb capability curves 531 include a first curve 532 and a second curve 534. The first curve 532 is displayed on the vertical profile view 320 and identifies first maximum heights 536 over which the aircraft 302 can clear the terrain 322 when climbing and then change to substantially level flight with respect to the current state 312.

The second curve 534 also may be displayed on the vertical profile view 320. The second curve 534 identifies second maximum heights 538 over which the aircraft 302 can clear the terrain 322 without taking into account whether the aircraft 302 can change to substantially level flight. In other words, the aircraft 302 may clear the terrain 322 but may not be able to change to a substantially level flight. More specifically, the aircraft 302 may clear the terrain 322 but also may have a climb angle that is greater than zero. In other illustrative examples, the second curve 534 may additionally reflect a change from the current state 312, such as a slowing of the aircraft 302, to permit a steeper climb angle.

Further, in these illustrative examples, when the aircraft 302 climbs over the terrain 322 such that the terrain 512 remains below the first curve 532, the aircraft 302 may have a greater safety margin as compared to when climbing over the terrain 322 such that the terrain 512 remains below the second curve 534. The safety margin is the distance of the aircraft 510 above the terrain 512 or of the aircraft 302 above the terrain 322.

In other illustrative examples, one or more safety margins may be created when generating the climb capability information 332 for the aircraft 302. As one illustrative example, an assumption may be made that the aircraft 302 has reduced capabilities as compared to the capabilities of the aircraft 302 described in the characteristics 313 for the aircraft 302. As a result, the shape of the climb capability information 332, the first curve 532, and/or the second curve 534 that is generated may reflect these safety margins. In these illustrative examples, the first curve 532 may have an increased safety margin as compared to the second curve 534.

In these illustrative examples, the current state 312 of the aircraft 302 may change continuously during flight. For example, the current state 312 may change in response to the use of fuel, a change in the gross weight of the aircraft 302, a change in airspeed, a change in ground speed, or some other suitable change. The current climb capability curves 531 may change continuously or periodically as the current state 312 of the aircraft 302 changes.

In this manner, the current climb capability curves 531 provide the capability to identify the climb capability of the aircraft 302 relative to the terrain 322 using the aircraft 510 and the terrain 512 in the vertical profile view 320. The climb capability of the aircraft 302 is for the terrain 322 below and ahead of the aircraft 302. In these illustrative examples, the first curve 532 and the second curve 534 of the current climb capability curves 531 may be generated using the information 310 provided by the sensors 306 in the aircraft 302.

Further, the minimum clearance height 323 identified by the terrain situation module 307 in FIG. 3 may be displayed on the vertical profile view 320 as a minimum clearance height 323. The minimum clearance height 323 may be a preselected value. The minimum clearance height 323 may be selected based on the height of the aircraft 302, rules, policies, safety requirements, and/or other factors. Additionally, the minimum clearance height 323 also may be selected based on user input, such as the user input 417 from an operator of the aircraft 302 in FIG. 4.

In this illustrative example, the first curve 532 and the second curve 534 are generated using the minimum clearance height 323. In particular, the first curve 532 may begin at a position below the aircraft 510 on the vertical profile view 320 by the minimum clearance height 323. In other words, the first curve 532 may be translated below the aircraft 510 by the minimum clearance height 323.

If a portion of the terrain 512 intersects the first curve 532, a first alert 542 may be generated to provide an alert to an operator. The first alert 542 indicates that substantially level flight may not occur after clearing the terrain 322 for the current state 312 of the aircraft 302. In other words, in the current state 312 of the aircraft 302, substantially level flight may not occur when clearing the terrain 322. In other words, the state of the aircraft 302 may need to change to be able to obtain substantially level flight when clearing the terrain 322. In other illustrative examples, the first alert 542 indicates that clearing the terrain 322 for the current state 312 of the aircraft 302 may not occur within the desired safety margin.

In these illustrative examples, the second curve 534 may begin at a position below the aircraft 510 on the vertical profile view 320 by a distance substantially equal to the minimum clearance height 323. In other illustrative examples, the second curve 534 may begin at a position below the aircraft 510 by a distance that is a percentage of the minimum clearance height 323. This percentage may be, for example, about 70 percent. In other words, the second curve 534 may begin at a position below the aircraft 510 at a distance substantially equal to about 70 percent of the minimum clearance height 323.

If the second curve 534 intersects the terrain 512, a second alert 544 may be generated. The second alert 544 may be presented in the vertical profile view 320. In these illustrative examples, the second alert 544 indicates that with the current state 312 of the aircraft 302, the aircraft 302 cannot clear the terrain 322 substantially at the minimum clearance height 323.

As a result, the second alert 544 indicates that the aircraft 302 cannot clear the terrain for the current state 312 of the aircraft 302 with the reduced safety margin of the second curve 534 and that action may need to be taken to avoid contact with the terrain 322. This action may be, for example, without limitation, at least one of increasing engine power, decreasing airspeed, changing the climb angle, turning, and/or some other suitable operation.

The potential climb capability curves 529 are generated in a manner similar to the manner in which the current climb capability curves 531 are generated but with respect to the number of potential states 311 of the aircraft 302. For example, the potential climb capability curves 529 may be generated using a potential state 535 in the potential states 311 of the aircraft 302 received from the flight management system 410 in FIG. 4. In this manner, the potential climb capability curves 529 identify a potential climb capability of the aircraft 302 if the potential state 535 for the aircraft 302 occurs.

In these illustrative examples, the potential climb capability curves 529 may include a first curve 537 and a second curve 539 that identify the climb capability of the aircraft 302 with respect to the potential state 535 of the aircraft 302. The first curve 537 identifies first maximum heights 543 of the terrain 322 that the aircraft 302 can clear by climbing and then changing to a substantially level flight when the aircraft 302 is in the potential state 535 with a desired safety margin. The second curve 539 identifies second maximum heights 545 of the terrain 322 that the aircraft 302 can clear by climbing without taking into account whether the aircraft 302 can change to the substantially level flight, whether the aircraft 302 must change from the potential state 535, or whether a different safety margin is desired.

In this illustrative example, both the first curve 537 and the second curve 539 are generated based on the potential state 535 of the aircraft 302 and the minimum clearance height 323 selected for the aircraft 302. Further, a portion of the first curve 537 and/or the second curve 539 of the potential climb capability curves 529 may overlap with a portion of the first curve 532 and the second curve 534 of the current climb capability curves 531.

As illustrated, when a portion of the terrain 512 intersects the first curve 537 or is above the first curve 537, a third alert 547 may be generated. The third alert 547 indicates that the aircraft 302 would not be able to clear the terrain 322 in substantially level flight, with the minimum clearance height 323, and/or with a desired safety margin if the aircraft 302 were to be in the potential state 535. Similarly, when a portion of the terrain 512 intersects the second curve 539 or is above the second curve 539, a fourth alert 549 may be generated. The fourth alert 549 indicates that the aircraft 302 would not be able to clear the terrain 322 at a desired percentage of the minimum clearance height 323 and/or with a desired safety margin if the aircraft 302 were to be in the potential state 535.

In this depicted example, the potential climb capability curves 529, the current climb capability curves 531, and the alerts 542, 544, 547, and 549 may be presented in a number of different ways. In these illustrative examples, the different curves of the climb capability curves 528 may be presented using different colors, patterns, line thicknesses, line types, or other types of graphical indicators to distinguish these curves from each other.

For example, the first curve 532 of the current climb capability curves 531 may be displayed as a solid blue curve, while the second curve 534 of the current climb capability curves 531 may be displayed as a solid red curve. Further, the first curve 537 of the potential climb capability curves 529 may be displayed using a dashed blue curve, while the second curve 539 of the potential climb capability curves 529 may be displayed using a dashed red curve.

The different maximum heights may be identified as the spaces below the climb capability curves 528. For example, these spaces may be colored or shaded. Further, these spaces may include annotations to provide a better indication of the differences in maximum heights.

For example, the terrain 512 may be presented in different colors at different relative altitudes from the aircraft 510. As a specific example, red may be used for the terrain 512 above the height of the aircraft 510. Yellow may be used for the terrain 512 between the height of the aircraft 510 and a height at the minimum clearance height 323 below the aircraft 510. Green or black may be used for the terrain 512 at a height greater than the minimum clearance height 323 below the aircraft 510.

The different alerts; the first alert 542, the second alert 544, the third alert 547, and the fourth alert 549, may be presented using graphical indicators in the form of graphical icons, text, or other suitable indicators. Further, the alerts also may be presented using sound or audio in addition to or in place of the graphical indicators.

In these illustrative examples, the scale system 520 on the vertical profile view 320 comprises a vertical axis 546 and a horizontal axis 548. The scale system 520 may include a combination of a linear scale 550 and a logarithmic scale 552 on the horizontal axis 548. For example, a first portion of the horizontal axis 548 may be displayed using a linear scale, while a second portion of the horizontal axis 548 may be displayed using a logarithmic scale.

In these depicted examples, the transition between the linear scale 550 and the logarithmic scale 552 along the horizontal axis 548 may be such that the scaling of the pixels is the same at this transition area. The scaling of pixels in the portion of the horizontal axis 548 that uses the logarithmic scale changes along the horizontal axis 548 past the transition area.

For ranges closer to the aircraft 510, the linear scale 550 may be used. For ranges farther away from the aircraft 510, the logarithmic scale 552 may be used. For example, without limitation, a range of up to about one nautical mile may be presented using linear scale 550, while a longer range, such as from about one nautical mile to about 20 nautical miles, may be presented using the logarithmic scale 552. Of course, other distances may be used, depending on the particular implementation.

The linear scale 550 for the ranges closer to the aircraft 510 provides a pilot with the ability to see the terrain 512 near to and directly below the aircraft 510. The terrain 512 near to the aircraft 510 may include the terrain 512 behind and/or in front of the aircraft 510.

For distances farther out, a pilot or other operator may wish to see or identify the terrain 512. However, at these distances, the detail or information about the terrain farther out may not be as important and compression of the logarithmic scale may leave more space in the vertical profile view 320 for the ranges closer to the aircraft 510. In this manner, the operator may be able to view more detail for the ranges closer to the aircraft 510. In these illustrative examples, the transition from the linear scale 550 to the logarithmic scale 552 may be seamless or may be identified using a graphical indicator.

Additionally, in the scale system 520, the vertical axis 546 may be scaled to always present the terrain 512 below the aircraft 510. In other words, the vertical axis 546 may have a scale that changes such that the terrain 512 is always displayed in the vertical profile view 320.

In these illustrative examples, the vertical axis 546 may employ a relative scale 554. The relative scale 554 is scaled relative to the altitude of the aircraft. For example, the relative scale 554 may show the height of the aircraft 510 as being zero with the distances above and below the aircraft on the vertical axis 546 being presented as distances relative to the aircraft 510.

In some illustrative examples, a pilot may select a desired minimum height and a maximum height based on the highest and lowest parts of the climb capability curves 528. Using the relative scale 554, the scale system 520 may change as the aircraft 302 moves, as the current state 312 changes, as the minimum clearance height 323 changes, and/or other changes occur. In other words, the scale system 520 may continuously change while the aircraft 302 is in flight. Further, the scale system 520 changes automatically without human interaction. In this manner, visibility of the terrain 512 in the vertical profile view 320 is continuously maintained.

In these illustrative examples, the scale system 520 changes by either expanding or contracting. For example, the scale system 520 may expand to quickly present new terrain heights as they are encountered. In other words, the scale system 520 may expand when terrain 512 with a greater range of heights is encountered. Further, the scale system 520 may contract when terrain 512 with a smaller range of heights is encountered.

In these examples, the scale system 520 may contract more slowly than the scale system 520 expands and/or after a delay. The scale system 520 changes in a manner that prevents undesired changes, such as constantly and/or rapidly alternating between expansion and contraction.

In other advantageous embodiments, the relative scale 554 may change in response to user input. The user input may include, for example, a change to the scale system 520 for the horizontal axis 548. In yet other advantageous embodiments, the linear scale 550 and/or the logarithmic scale 552 for the horizontal axis 548 may change automatically and/or continuously in a manner similar to the relative scale 554 for the vertical axis 546.

In these illustrative examples, the kinetic climb height indicator 516 is displayed on the vertical axis 546. The kinetic climb height indicator 516 identifies the height that the aircraft 302 can climb while the airspeed of the aircraft 302 decreases to a selected airspeed. In this example, at least a portion of the kinetic energy of the aircraft is converted into potential energy. This potential energy is based on the height of the aircraft 302 above the terrain 322.

In a fixed-wing aircraft, the selected airspeed may be an airspeed over a stall speed of the aircraft 302. The selected airspeed may be selected based on user input, rules, policies, safety requirements, and/or other suitable factors. For example, the selected airspeed may be about 20 percent or about 30 percent above a stall speed.

In a rotary-wing aircraft, the selected airspeed may be substantially zero such that the rotary-wing aircraft hovers. In other examples, the selected airspeed may be based on the current or potential altitude above ground, the edge of a region to be avoided on a height-velocity diagram, and/or other suitable factors.

As the aircraft 302 climbs, airspeed is lost. In other words, the airspeed of the aircraft 302 may change, while the engine power remains the same, to allow the aircraft 302 to climb to a height indicated by the kinetic climb height indicator 516. A change in the current airspeed of the aircraft 302 or a change in stall speed may change the position of the kinetic climb height indicator 516 on the vertical axis 546. The stall speed of the aircraft 302 may change based on the altitude of the aircraft 302, the gross weight of the aircraft 302, the bank angle, the configuration of the aircraft 302, and/or other suitable factors. As one illustrative example, the configuration of the aircraft 302 may change when flaps are deployed. This change in the configuration of the aircraft 302 decreases the stall speed of the aircraft 302.

Thus, the kinetic climb height indicator 516 indicates the amount of altitude the aircraft 302 can climb rapidly without a sustained climb.

The terrain altitude indicator 518 also is presented on the vertical axis 546. In other words, the terrain altitude indicator 518 is a graphical indicator, on the vertical profile view 320, of a current height of the terrain 322 below the aircraft 302. The terrain altitude indicator 518 represents the actual altitude of the terrain 322 as measured by the aircraft 302. The altitude may be measured using, for example, the radar altimeter 406 from FIG. 4.

Terrain altitude data 558 represents the estimated distance, above or below the aircraft 510, between the aircraft 510 and the terrain 512 depicted on the vertical profile view 320. In these illustrative examples, this distance is calculated based on the position and altitude of the aircraft 302 above the terrain 322 in the current state 312 of the aircraft 302. The terrain altitude data 558 is the altitude of the terrain 322 below the aircraft 302 identified using terrain data 318. In this example, the terrain altitude data 558 is relative to the aircraft 302. In particular, the terrain altitude data 558 is identified using the terrain elevation data 428 from FIG. 4 minus an altitude of the aircraft 302.

In other words, the terrain altitude indicator 518 indicates an actual altitude of the aircraft 302 above the terrain 322 as compared to the altitude estimated using the terrain altitude data 558.

In these illustrative examples, the terrain altitude indicator 518 provides a pilot a capability to identify the accuracy of the terrain data 318 used to present the terrain 512 in the vertical profile view 320. With this information, an operator may compare the terrain altitude indicator 518 and the terrain altitude data 558.

For example, an operator may compare the terrain altitude indicator 518 and the terrain altitude data 558 over time to identify the accuracy or error in the vertical profile view 320. The accuracy or error being identified may be for the terrain data 318 used to generate the terrain 512 or for the position and altitude of the aircraft 510 in the vertical profile view 320. With this information, an operator may determine the reliability of the terrain 512 on the vertical profile view 320 and decide whether the vertical profile view 320 should be used in operation of the aircraft 302.

A horizontal display 562 may include a horizontal view of the terrain 512 and a representation of the flight plan 416 with a number of way points 560. The horizontal view of the terrain 512 may be, for example, a bird's eye view of the terrain 322. In some illustrative examples, the horizontal display 562 and the vertical profile view 320 may be displayed on the graphical user interface 324 at the same time.

A number of way points 522 are displayed on the vertical profile view 320 in these illustrative examples. These way points 522 may correspond to the way points 560 on the horizontal display 562. This information may be used when turns or other maneuvers are made at the way points 522. In other words, the way points 522 in the vertical profile view 320 provide situational awareness of the terrain elevations under locations for upcoming turns.

In these illustrative examples, the way points 522 may be displayed at the same height as the aircraft 510. In other illustrative examples, the way points 522 may be displayed on the vertical profile view 320 at heights relative to the altitude of the way point planned in a flight plan.

A pilot may be able modify his climb over the terrain 322 using the way points 522 to take into account different types of situations. These situations may include, for example, without limitation, accelerated stalls, reduced climbs, and/or other situations at the way points 522 on the vertical profile view 320.

As depicted, turn points 524 may also be displayed on the vertical profile view 320. In these illustrative examples, a turn point is presented before and after a way point in the way points 522. The turn points 524 indicate one of a beginning of a turn and an ending of the turn. In these examples, the turn is associated with the way point. For example, the first turn point before a way point indicates when the turn begins. A turn point after the way point indicates when the turn ends. A pilot may use the distance between a beginning turn point and an ending turn point for a way point to take into account different types of situations. These situations may include, for example, without limitation, accelerated stalls, reduced climbs, and/or other types of situations.

Terrain points 526 identify a terrain point 564 on the terrain 512 relative to a present location of the aircraft 510 in the terrain 512 presented on the vertical profile view 320. The terrain point 564 identifies a point in the terrain 322 requiring the largest immediate climb by the aircraft 302, for the aircraft 302 to be able to clear the terrain 322 based on the current state 312 of the aircraft 302 and the terrain 322.

In these illustrative examples, the terrain point 564 is represented on the vertical profile view 320 using a critical terrain point indicator 565. The current state 312 of the aircraft 302 is represented in the first curve 532. The critical terrain point indicator 565 is displayed at the point of the terrain 512 that is closest vertically to the first curve 532 when the terrain 512 does not intersect the first curve 532. If the terrain 512 intersects the first curve 532, the critical terrain point indicator 565 is displayed at the point of the terrain 512 that is highest above the first curve 532.

The illustration of the display generation module 420 in FIG. 5 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, the terrain situation information 326 may not include all of the information presented in this example. For example, in some advantageous embodiments, the second curve 534 may not be used with the first curve 532. In yet other examples, the way points 522 and the turn points 524 may not be included in the terrain situation information 326.

In still other advantageous embodiments, additional information may be included. For example, without limitation, notices, such as notice to airmen (NOTAM), may be presented in a window or separate section within the graphical user interface 324. In another example, these notices may be presented in a position relative to the aircraft 510 on the vertical profile view 320 and/or the horizontal display 562.

In addition, various graphical indicators may be used to distinguish or identify the different types of terrain situation information 326. For example, different types of terrain 512 may be indicated using different colors, cross hatching, shading, or other suitable types of graphical indicators. In addition, information that is more important may be given more emphasis through other indicators, such as flashing text, flashing icons, sound, and other suitable types of indicators.

Figure 6:
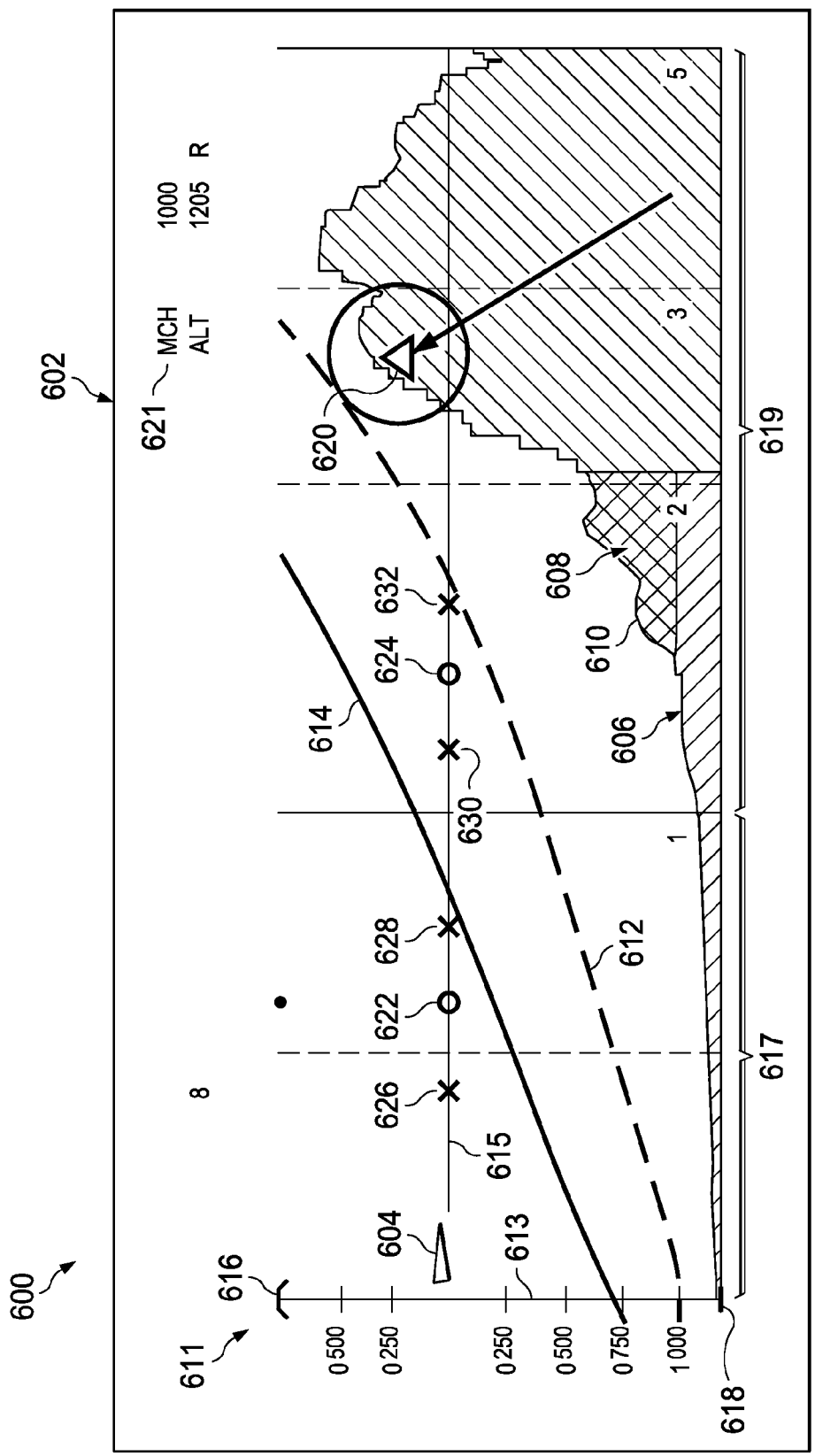
FIG. 6 is an illustration of a graphical user interface in accordance with an advantageous embodiment.

With reference now to FIG. 6, an illustration of a graphical user interface is depicted in accordance with an advantageous embodiment. In this illustrative example, the graphical user interface 600 is an example of one manner in which the graphical user interface 324 generated by the display generation module 420 from FIG. 4 may be implemented.

The graphical user interface 600 displays terrain situation information in the form of a vertical profile view 602 in these examples. The vertical profile view 602 includes an aircraft 604 displayed in a position relative to a terrain 606. As depicted, the terrain 606 is depicted as a shaded area 608 under a terrain curve 610. The shaded area 608 has different levels of shading in these examples.

In this illustrative example, the vertical profile view 602 has a scaling system 611. The scaling system 611 has a vertical axis 613 and a horizontal axis 615. A portion 617 of the horizontal axis 615 uses a linear scale, and a portion 619 of the horizontal axis 615 uses a logarithmic scale in this illustrative example.

In this depicted example, the vertical profile view 602 includes a first curve 612 and a second curve 614. The first curve 612 identifies the maximum height over which the aircraft 604 can clear by a minimum clearance height 621 when climbing and then change to substantially level flight. In this example, the minimum clearance height 621 is about 1,000 feet. The second curve 614 identifies the maximum height over which the aircraft 604 can clear by about 60 percent of the minimum clearance height 621, in this illustrative example, taking into account whether the aircraft 604 can change to substantially level flight.

An operator of the aircraft may be able to compare the first curve 612 and the second curve 614 with the terrain curve 610 in the vertical profile view 602. For example, an operator may compare these curves to determine when and by how much distance the aircraft 604 may need to clear upcoming terrain.

Further, in this illustrative example the vertical profile view 602 also includes a kinetic climb height indicator 616, a terrain altitude indicator 618, and a terrain point 620. The kinetic climb height indicator 616 identifies the altitude to which the aircraft 604 can climb while the airspeed of the aircraft 604 decreases. The airspeed of the aircraft 604 may decrease without substantially changing engine power or while in a sustained climb. The kinetic climb height indicator 616 may have different shapes and/or sizes. As one example, the kinetic climb height indicator 616 may be a straight line segment when the kinetic climb height is within the range of the vertical axis 613 and a dog-eared segment when the kinetic climb height is greater than the range of the vertical axis 613.

The terrain altitude indicator 618 indicates a measured altitude of the terrain 606. The terrain point 620 identifies the terrain point requiring the largest immediate climb to be cleared by the aircraft 604 based on the current state of the aircraft. The current state of the aircraft may be, for example, the current state 312 in FIG. 3.

As depicted, the vertical profile view 602 displays way points 622 and 624. The vertical profile view 602 also displays turn points 626 and 628 for the way point 622 and turn points 630 and 632 for the way point 624.

The vertical profile view 602, in these examples, is displayed at one point in time. Along a flight path of the aircraft 604, the vertical profile view 602 may change in response to changes in the terrain situation information over time. For example, the climb capability of the aircraft may change in response to changes in the state of the aircraft.

As a specific example, when the gross weight of the aircraft changes, the first curve 612 and/or the second curve 614 may change. The gross weight of the aircraft may change in response to the use of fuel during flight, the loading and/or unloading of cargo during flight, or some other suitable reason. Changes in the gross weight of the aircraft may also affect the position of the terrain point 620 on the terrain 606 in the vertical profile view 602.

As yet another example, when the airspeed of the aircraft changes, the position of the kinetic climb height indicator 616 may change. Changes in the ground speed of the aircraft may also change the positioning of the first curve 612 and/or the second curve 614.

Figure 7:
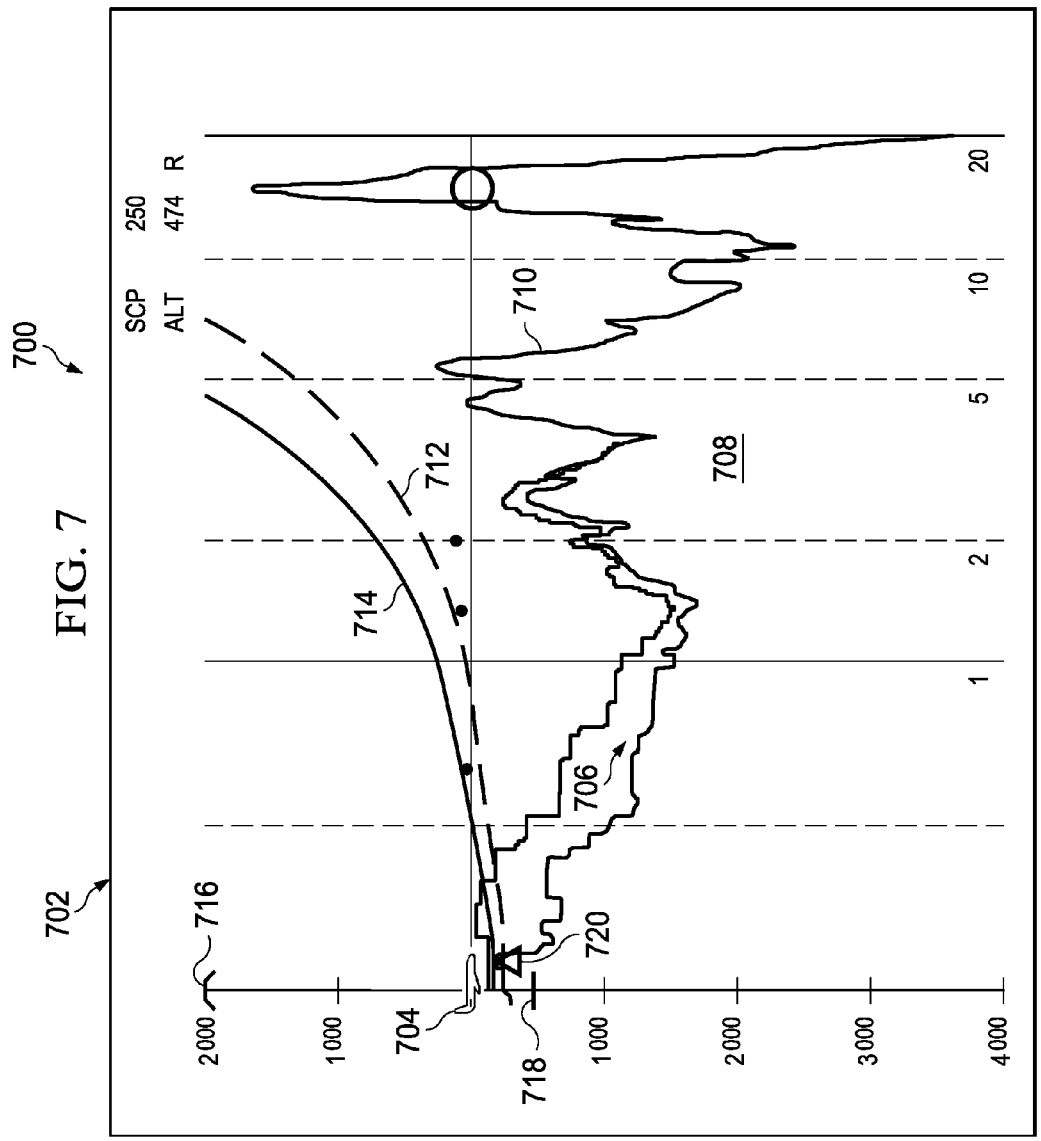
FIG. 7 is an illustration of another graphical user interface in accordance with an advantageous embodiment.

With reference now to FIG. 7, an illustration of another graphical user interface is depicted in accordance with an advantageous embodiment. In this illustrative example, the graphical user interface 700 is an example of one manner in which the graphical user interface 324 generated by the display generation module 420 from FIG. 4 may be implemented.

In this illustrative example, the graphical user interface 700 displays a vertical profile view 702. The vertical profile view 702 includes an aircraft 704 displayed in a position relative to a terrain 706. As depicted, the terrain 706 is depicted as an area 708 under a terrain curve 710. In this depicted example, the terrain 706 is displayed as the area 708 under the terrain curve 710 as compared to the shaded area 608 under the terrain curve 610 for the terrain 606 in FIG. 6.

As depicted, the vertical profile view 702 also includes a first curve 712 and a second curve 714. Further, in this illustrative example, the vertical profile view 702 displays a kinetic climb height indicator 716, a terrain altitude indicator 718, and a terrain point 720. The kinetic climb height indicator 716 identifies the height that the aircraft 704 can climb while the airspeed of the aircraft 704 decreases to a selected airspeed. The terrain altitude indicator 718 indicates a measured altitude of the terrain 706. The terrain point 720 identifies the terrain point requiring the largest immediate climb to be cleared by the aircraft 704 based on the current state of the aircraft.

Figure 8:
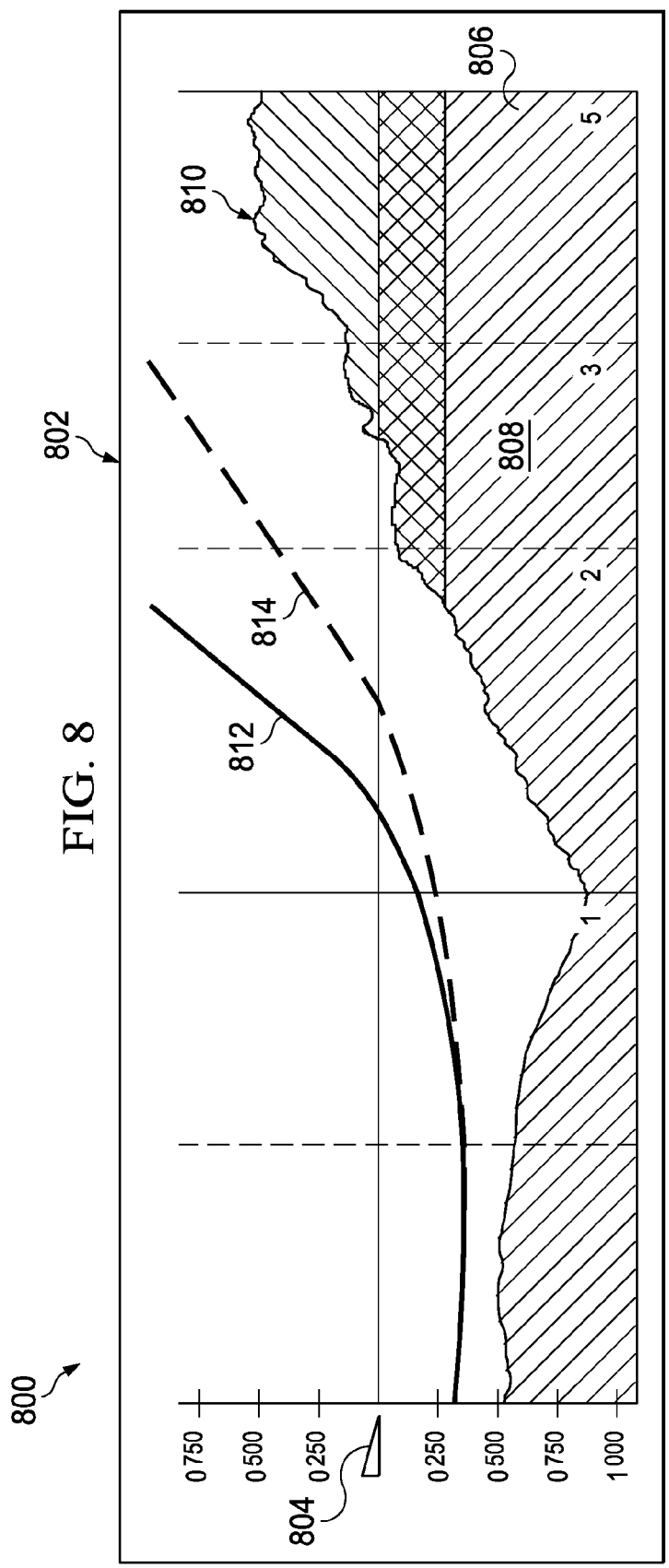
FIG. 8 is an illustration of a graphical user interface in accordance with an advantageous embodiment.

Turning now to FIG. 8, an illustration of a graphical user interface is depicted in accordance with an advantageous embodiment. In this illustrative example, a graphical user interface 800 is an example of one manner in which the graphical user interface 324 generated by the display generation module 420 from FIG. 4 may be implemented.

In this illustrative example, the graphical user interface 800 displays a vertical profile view 802. The vertical profile view 802 includes an aircraft 804 displayed in a position relative to terrain 806. As depicted, the terrain 806 is depicted as a shaded area 808 under a terrain curve 810.

In this illustrative example, a solid curve 812 and a dashed curve 814 are displayed on the vertical profile view 802. The solid curve 812 is an example of the first curve 532 of the current climb capability curves 531 from FIG. 5. The solid curve 812 identifies the climb capability for the aircraft 804 with respect to a current state of the aircraft 804. In particular, the solid curve 812 identifies the maximum heights over which the aircraft 804 can clear the terrain 806 when climbing and then change to substantially level flight with respect to the current state for the aircraft 804.

The dashed curve 814 is an example of the first curve 537 of the potential climb capability curves 529 from FIG. 5. The dashed curve 814 identifies the climb capability for the aircraft 804 with respect to a potential state of the aircraft 804. The dashed curve 814 identifies the maximum heights over which the aircraft 804 can clear the terrain 806 without taking into account whether the aircraft 804 can change to substantially level flight. As depicted, a portion of the solid curve 812 and a portion of the dashed curve 814 overlap.

Figure 9:
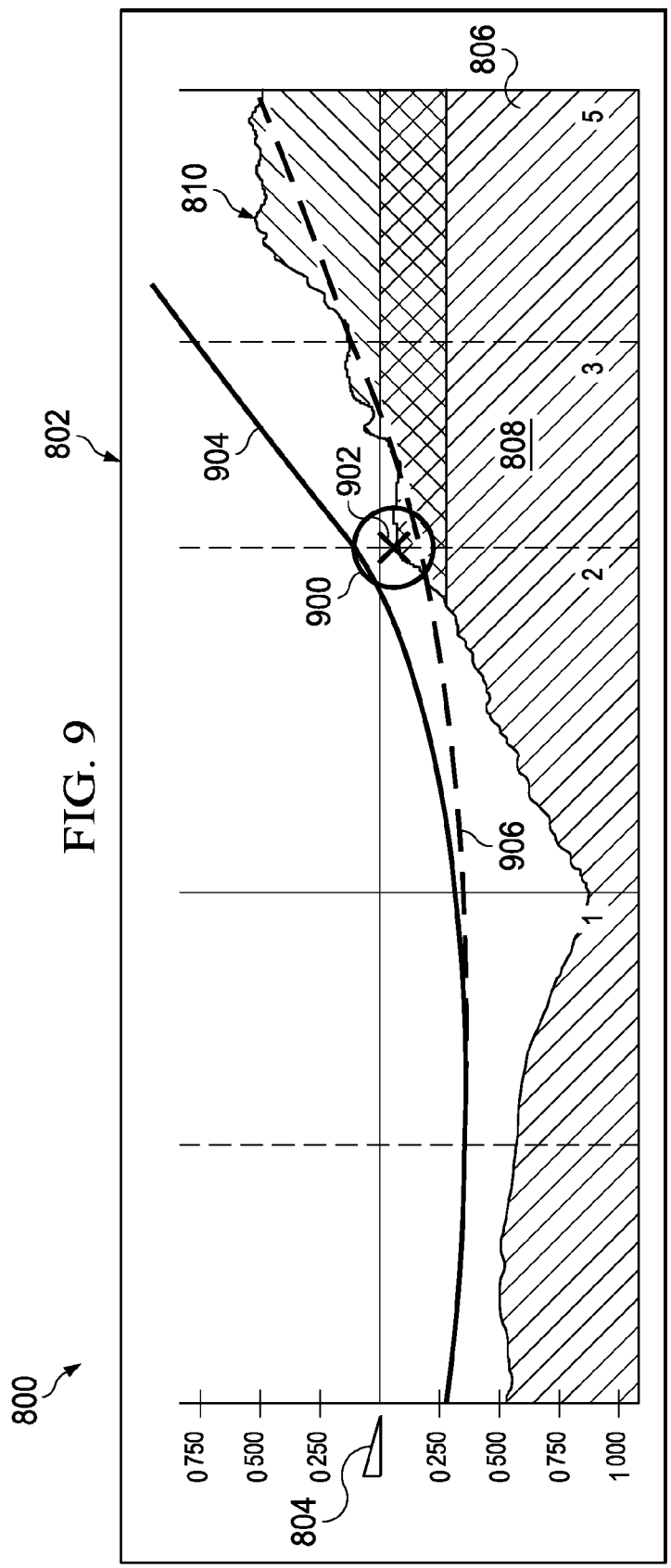
FIG. 9 is an illustration of a graphical user interface in accordance with an advantageous embodiment.

With reference now to FIG. 9, the graphical user interface 800 from FIG. 8 is depicted in accordance with an advantageous embodiment. In this illustrative example, a solid curve 904 and a dashed curve 906 are displayed on the vertical profile view 802. The solid curve 904 is an example of the first curve 532 of the current climb capability curves 531 from FIG. 5. The solid curve 904 identifies the climb capability for the aircraft 804 with respect to a current state of the aircraft 804.

The dashed curve 906 is an example of the first curve 537 of the potential climb capability curves 529 from FIG. 5. The dashed curve 906 identifies the climb capability for the aircraft 804 with respect to a particular potential state of the aircraft 804.

As depicted, the dashed curve 906 intersects the terrain 806. As a result, an alert 900 is displayed on the vertical profile view 802. The alert 900 takes the form of a symbol 902. The symbol 902 indicates that the aircraft 804 would be unable to clear the terrain 806 if the aircraft 804 were to be in the potential state for which the dashed curve 814 was generated.

Figure 10:
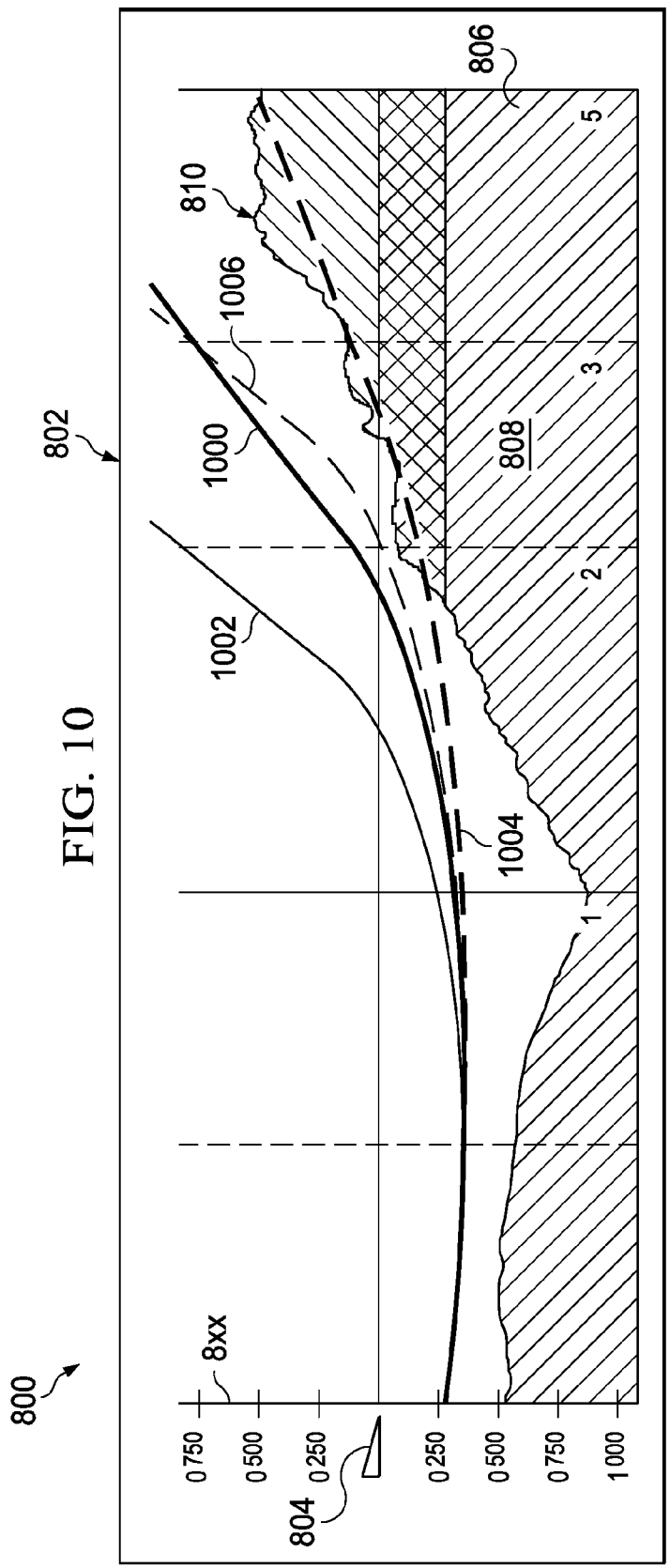
FIG. 10 is an illustration of a graphical user interface in accordance with an advantageous embodiment.

Turning now to FIG. 10, the graphical user interface 800 from FIG. 8 is depicted in accordance with an advantageous embodiment. In this illustrative example, a first solid curve 1000 and a second solid curve 1002 are displayed on the vertical profile view 802. The first solid curve 1000 is an example of the first curve 532 of the current climb capability curves 531 from FIG. 5. The first solid curve 1000 identifies the climb capability for the aircraft 804 with respect to a current state of the aircraft 804. In particular, the first solid curve 1000 identifies the maximum heights over which the aircraft 804 can clear the terrain 806 when climbing and then change to substantially level flight with respect to the current state for the aircraft 804.

The second solid curve 1002 is an example of the second curve 534 of the current climb capability curves 531 from FIG. 5. The second solid curve 1002 identifies the maximum heights over which the aircraft 804 can clear the terrain 806 without taking into account whether the aircraft 804 can change to substantially level flight.

Additionally, a first dashed curve 1004 and a second dashed curve 1006 are also displayed on the vertical profile view 802. The first dashed curve 1004 is an example of the first curve 537 of the potential climb capability curves 529 from FIG. 5. The first dashed curve 1004 identifies the climb capability for the aircraft 804 with respect to a potential state of the aircraft 804. In particular, the first dashed curve 1004 identifies the maximum heights of the terrain 806 that the aircraft 804 can clear by climbing and then changing to a substantially level flight when the aircraft 804 is in the potential state with a desired safety margin.

Further, the second dashed curve 1006 is an example of the second curve 539 of the potential climb capability curves 529 from FIG. 5. The second dashed curve 1006 identifies the maximum heights of the terrain 806 that the aircraft 804 can clear by climbing without taking into account whether the aircraft 804 can change to the substantially level flight, whether the aircraft 804 must change from the potential state, or whether a different safety margin is desired.

The illustrations of the graphical user interface 600 in FIG. 6, the graphical user interface 700 in FIG. 7, and the graphical user interface 800 in FIGS. 8-10 are not meant to imply physical or architectural limitations to the manner in which different advantageous embodiments may be implemented. Other components in addition to and/or in place of the ones illustrated may be used. Some components may be unnecessary in some advantageous embodiments.

For example, in other advantageous embodiments, the vertical profile view 702 may be presented in a number of different ways using the graphical user interface 700. For example, in some advantageous embodiments, some portions of the terrain 706 under the terrain curve 710 may be shaded or colored, while other portions may not be shaded. As a specific example, portions of the terrain 706 representing heights above a selected height may be shaded. For example, in another advantageous embodiment, some portions of the terrain curve 710 may be colored. The colors may be selected to represent a source or quality of the terrain data depicted or the relative height of the terrain to the aircraft.

In still other advantageous embodiments, other types of indicators in addition to or in place of the ones depicted may be present in the vertical profile view 702.

Figure 11:
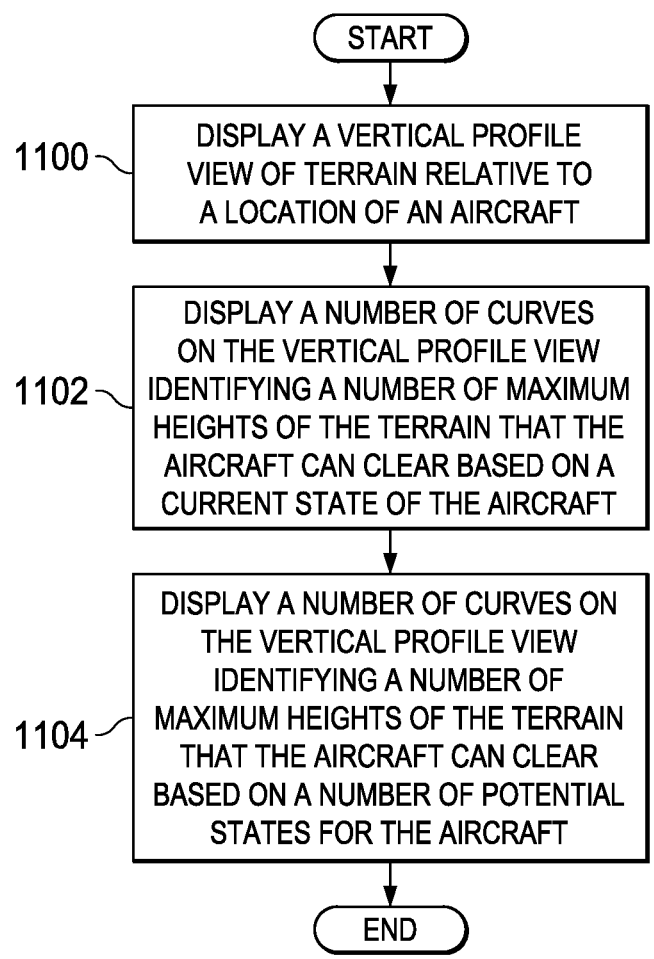
FIG. 11 is an illustration of a flowchart of a process for presenting information to operate an aircraft over terrain in accordance with an advantageous embodiment.

With reference now to FIG. 11, an illustration of a flowchart of a process for presenting information to operate an aircraft over terrain is depicted in accordance with an advantageous embodiment. The process illustrated in FIG. 11 may be implemented using the terrain situation module 307 from FIG. 3 and the graphical user interface 324 from FIG. 5.

The process begins by displaying the vertical profile view 320 of the terrain 322 relative to a location of the aircraft 302 (operation 1100). The process displays a number of curves on the vertical profile view 320 identifying a number of maximum heights 336 of the terrain 322 that the aircraft 302 can clear based on the current state 312 of the aircraft 302 (operation 1102). In operation 1102, the number of curves displayed may be, for example, the current climb capability curves 531 in FIG. 5. In this manner, the number of curves displayed in operation 1102 identify the climb capability for the aircraft 302 based on the current state 312 of the aircraft 302.

The process also displays a number of curves on the vertical profile view 320 identifying a number of maximum heights of the terrain 322 that the aircraft 302 can clear based on a number of potential states 311 for the aircraft 302 (operation 1104), with the process terminating thereafter. In operation 1104, the number of curves displayed may be, for example, the potential climb capability curves 529 in FIG. 5. The potential state 535 from FIG. 5 is an example of one of the potential states 311 of the aircraft 302 in FIG. 3. In this manner, the number of curves displayed in operation 1104 identify the climb capability for the aircraft 302 based on the number of potential states 311 of the aircraft 302.

Figure 12:
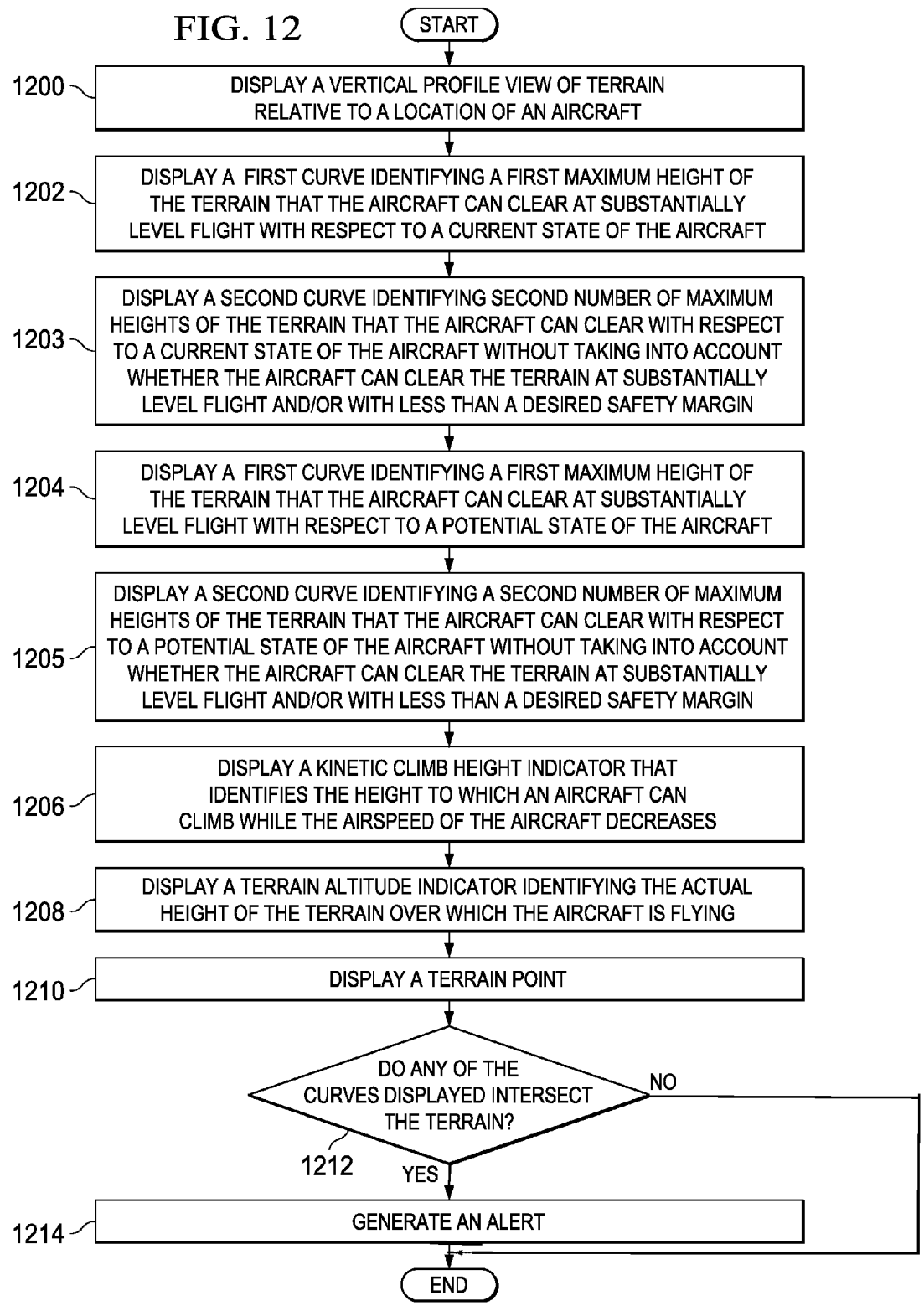
FIG. 12 is an illustration of a flowchart of a process for presenting information about a terrain in accordance with an advantageous embodiment.

With reference now to FIG. 12, an illustration of a flowchart of a process for presenting information about a terrain is depicted in accordance with an advantageous embodiment. The process illustrated in FIG. 12 may be implemented using the terrain situation module 307 from FIG. 3.

The process begins by displaying a vertical profile view 320 of terrain 322 relative to a location of an aircraft 302 (operation 1200). This vertical profile view 320 may be implemented using the vertical profile view 320 in FIG. 5. More specifically, the vertical profile view 320 may be implemented using the vertical profile view 702 in FIG. 7 or the vertical profile view 802 in FIG. 8.

Thereafter, the process displays a first curve 532 identifying a first maximum height of the terrain 322 that the aircraft 302 can clear at substantially level flight with respect to a current state 312 of the aircraft 302 (operation 1202). The process then displays a second curve 534 identifying a second number of maximum heights of the terrain 322 that the aircraft 302 can clear with respect to a current state 312 of the aircraft 302 without taking into account whether the aircraft 302 can clear the terrain 322 at substantially level flight and/or with less than a desired safety margin (operation 1203). The first curve 532 and the second curve 534 displayed in operations 1202 and 1203 are the current climb capability curves 531.

In operations 1202 and 1203, the first curve 532 and the second curve 534 are based on the current state 312 of the aircraft 302. The current state 312 of the aircraft may be, for example, the current state 312 in FIG. 3. Further, the current state 312 of the aircraft may comprise at least one of an aircraft condition, an aircraft position, an aircraft movement, an aircraft system status, atmospheric measurements, design characteristics of the aircraft, and/or other suitable information.

The process displays a first curve 537 identifying a first maximum height of the terrain 322 that the aircraft 302 can clear at substantially level flight with respect to a potential state 535 of the aircraft (operation 1204). The process then displays a second curve 539 identifying a second number of maximum heights of the terrain 322 that the aircraft can clear with respect to the potential state 535 of the aircraft without taking into account whether the aircraft 302 can clear the terrain 322 at substantially level flight and/or with less than a desired safety margin (operation 1205). The first curve 537 and the second curve 539 displayed in operations 1204 and 1205 are the potential climb capability curves 529.

The process displays a kinetic climb height indicator 516 that identifies the height to which the aircraft 302 can climb while the airspeed of the aircraft 302 decreases (operation 1206). The airspeed of the aircraft 302 may decrease without substantially changing engine power. The selected airspeed may be some airspeed greater than a stall speed for a fixed-wing aircraft or substantially zero for a rotary-wing aircraft. The selected airspeed may be based on user input, rules, policies, safety requirements, and/or other suitable factors. The process displays a terrain altitude indicator 518 identifying the actual height of the terrain 322 over which the aircraft 302 is flying (operation 1208).

Thereafter, the process displays a terrain point 564 (operation 1210). The terrain point 564 identified may be the terrain point 564 requiring the largest current climb angle to be cleared by the aircraft 302 based on the current state 312 of the aircraft 302.

For example, a graphical indicator may be displayed on the terrain curve at a point closest to the first curve 532 in the operation 1202 if the first curve 532 is above the terrain curve. Further, a graphical indicator may be displayed on the terrain curve at the point having a highest height above the first curve 532 in operation 1202 if the first curve 532 intersects the terrain curve.

Thereafter, the process may determine whether any of the curves displayed intersect the terrain 322 (operation 1212). If any of the curves intersect the terrain 322, the process generates an alert (operation 1214), with the process terminating thereafter. Otherwise, the process terminates.

In the operation 1212, the alert may be a graphical indicator displayed on the vertical profile view 320, sound, an audio alert, a new window displayed over the vertical profile view 320, a symbol, and/or some other suitable type of alert.

Figure 13:
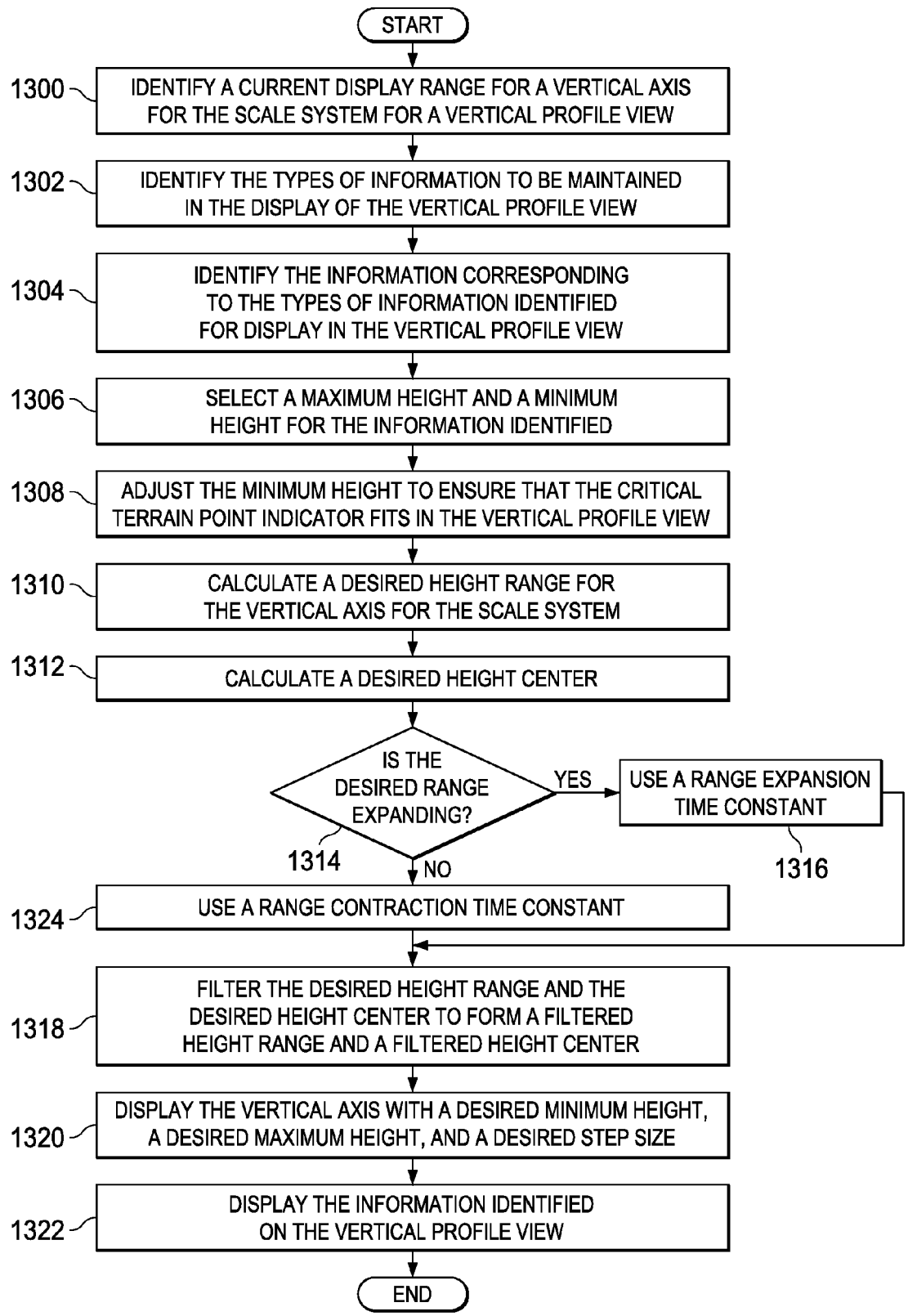
FIG. 13 is an illustration of a flowchart of a process for changing the scale system for a vertical profile view in accordance with an advantageous embodiment.

With reference now to FIG. 13, an illustration of a flowchart of a process for changing the scale system for a vertical profile view is depicted in accordance with an advantageous embodiment. The process illustrated in FIG. 13 may be implemented using the terrain situation module 307 from FIG. 3.

The process begins by identifying a current display range for a vertical axis 546 for the scale system 520 for the vertical profile view 320 (operation 1300). The current display range may be in, for example, inches, centimeters, or pixels. In these illustrative examples, the vertical axis 546 may represent altitude in feet, miles, kilometers, or some other suitable type of measurement.

The process then identifies the types of information to be maintained in the display of the vertical profile view 320 (operation 1302). The types of information may include, for example, without limitation, a profile of terrain, a minimum distance above and/or below an aircraft, a minimum clearance height setting, a terrain altitude identified by a sensor, and/or other suitable types of data. In operation 1302, the types of information to be kept displayed in the vertical profile view 320 may be identified based on user input, policies, a database, or other suitable factors.

Thereafter, the process identifies the information corresponding to the types of information identified for display in the vertical profile view 320 (operation 1304). For example, in operation 1304, the process identifies information within the range of the horizontal axis 548 for the vertical profile view 320. In operation 1304, at least a portion of the information is identified from stored terrain data.

The process then selects a maximum height and a minimum height for the information identified (operation 1306). The process adjusts the minimum height to ensure that the critical terrain point indicator 565 fits in the vertical profile view 320 (operation 1308).

Thereafter, the process calculates a desired range for the vertical axis 546 for the scale system 520 (operation 1310). In operation 1310, the desired height range is calculated using the following:

$$\text{desired height range} = (\text{maximum height} - \text{minimum height})/P_{RT}$$

where maximum height is the maximum height identified in operation 1306, minimum height is the adjusted minimum height in operation 1308, and $P_{RT}$ is a target percentage of a display to use. For example, the target percentage of a display may be the percentage of a display screen to be used for displaying the information identified in operation 1304 to be kept within the vertical profile view 320.

The process then calculates a desired height center (operation 1312). In operation 1312, the desired height center is calculated using the following:

$$\text{desired height center} = (\text{maximum height} + \text{minimum height})/2.$$

The process then determines whether the desired height range is expanding (operation 1314). In operation 1314, this determination is made by comparing the desired range for the vertical axis 546 for the scale system calculated in operation 1310 with a previous height range displayed in the vertical profile view 320. If the desired height range is expanding, the process uses a range expansion time constant to adjust the expansion (operation 1316). The range expansion time constant ensures that the range for the vertical axis 546 of the scale system 520 expands more rapidly than desired. If the range for the vertical axis 546 expands too rapidly or alternates between expansion and contraction too rapidly, an operator of the aircraft 302 may not be able to view the vertical profile view 320 as well as desired.

The process then filters the desired height range and the desired height center to form a filtered height range and a filtered height center (operation 1318). For example, in operation 1318, the filtering process may be performed using a second order linear filter. In operation 1318, the filtering of the desired height range is performed using, for example, the range expansion time constant calculated in operation 1316.

Thereafter, the process displays the vertical axis 546 with a desired minimum height, a desired maximum height, and a desired step size (operation 1320). The desired maximum height is calculated as follows:

$$\text{desired maximum height} = \text{filtered height center} + \text{filtered height range}/2)$$

where filtered height center is the filtered height center in operation 1318 and filtered height range is the filtered height range in operation 1318.

The desired minimum height is calculated as follows:

$$\text{desired minimum height} = \text{filtered height center} - (\text{filtered height range}/2).$$

The desired step size is calculated as follows:

$$\text{height scale} = \text{current display range}/\text{filtered range}$$

and $$\text{desired step size} = \text{MDS}/\text{height scale}$$

where MDS is a minimum display space between vertical axis labels. In other words, MDS is the minimum display space desired for the display screen between two labels or indicators on the vertical axis 546.

The process displays the information identified in the vertical profile view 320 (operation 1322), with the process terminating thereafter.

With reference again to operation 1314, if the desired height range calculated in operation 1310 is not expanding, the process uses a range contraction time constant to adjust this contraction (operation 1324). The range contraction time constant is used to ensure that the range for the vertical axis 546 of the scale system 520 contracts as rapidly as desired.

For example, if the range for the vertical axis 546 contracts too rapidly or alternates between expansion and contraction too rapidly, an operator of the aircraft 302 may not be able to view the vertical profile view 320 as well as desired. Thereafter, the process continues to operation 1318 as described above.

The range contraction time constant calculated in operation 1324 may be used to perform operation 1318. This range contraction time constant is used in place of the range expansion time constant in operation 1318. In some illustrative examples, the filtering performed in operation 1318 may use non-linear elements, such as, for example, a time delay prior to range contraction.

The process illustrated in FIG. 13 may also be applied to other axes, such as, for example, a horizontal axis. Further, this process may be used to maintain a desired view in the vertical profile view 320. The desired view may be based on any of a number of criteria.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or portion of an operation or step.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Figure 14:
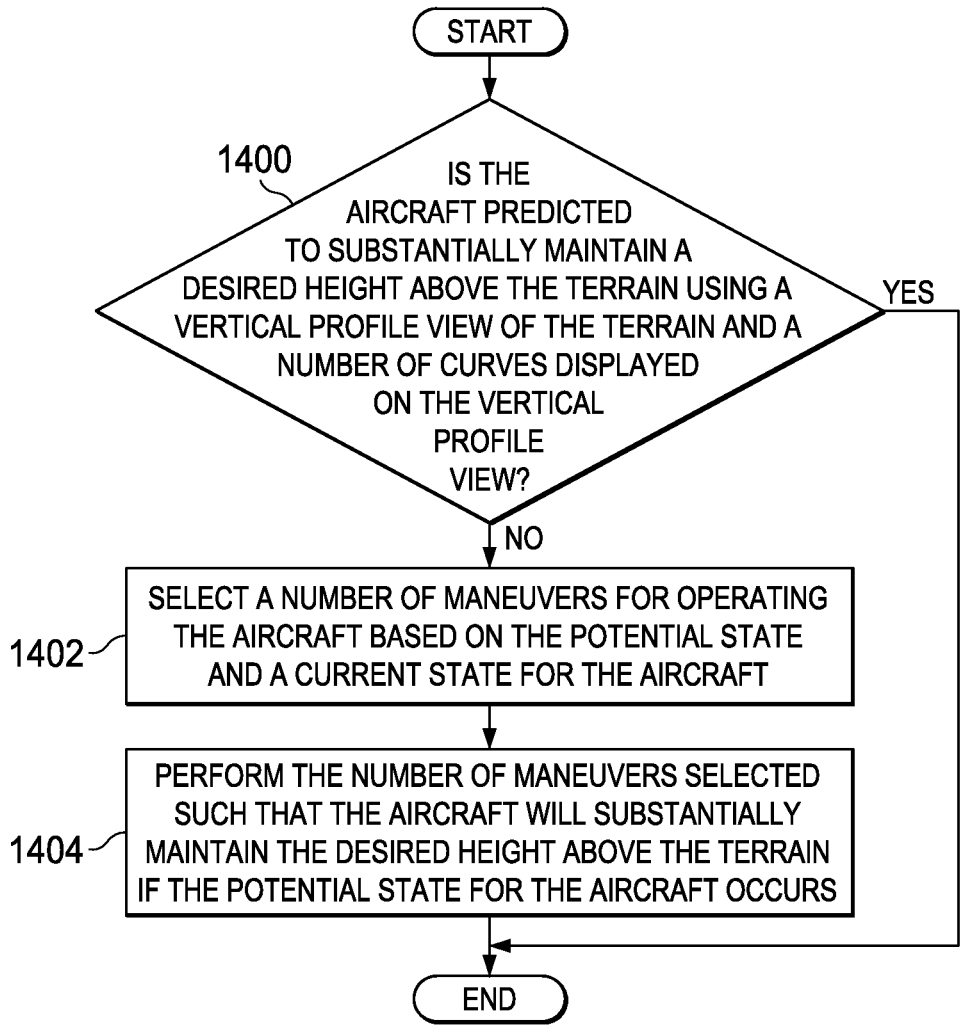
FIG. 14 is an illustration of a flowchart of a process for operating an aircraft over terrain in accordance with an advantageous embodiment.

With reference now to FIG. 14, an illustration of a flowchart of a process for operating an aircraft over terrain is depicted in accordance with an advantageous embodiment. The process illustrated in FIG. 14 may be implemented using a terrain information system, such as, for example, the terrain information system 304 in FIG. 3 and/or the terrain information system 500 in FIG. 5. Further, this process may be implemented by a pilot of the aircraft using the information provided by the terrain information system. Of course, in other illustrative examples, this process may be implemented by an autopilot system for the aircraft and/or some other suitable controller for the aircraft configured to operate the aircraft using the information provided by the terrain information system.

The process begins by determining whether the aircraft 302 is predicted to substantially maintain a desired height above the terrain 322 during a flight of the aircraft 302 using a vertical profile view 320 of the terrain 322 and a number of curves displayed on the vertical profile view 320 (operation 1400). The vertical profile view 320 of the terrain 322 and the number of curves displayed on the vertical profile view 320 may be displayed by the terrain information system 304. The desired height above the terrain 322 may be, for example, a minimum clearance height between the aircraft 302 and the terrain 322 desired while flying over the terrain 322.

The number of curves identify a number of maximum heights of the terrain 322 that the aircraft 302 can clear based on the potential state 535 for the aircraft 302. In the operation 1400, the pilot may view the vertical profile view 320 of the terrain 322 and the number of curves on a display system in the aircraft 302. Further, the pilot may use the vertical profile view 320 of the terrain 322 and the number of curves to determine the climb capability of the aircraft 302 based on the potential state 535 for the aircraft 302. In particular, the pilot uses the vertical profile view 320 of the terrain 322 and the number of curves to increase the vertical situation awareness of the pilot for the potential state 535 for the aircraft 302.

If the aircraft 302 is not predicted to substantially maintain the desired height above the terrain 322 during the flight of the aircraft 302, a number of maneuvers for operating the aircraft 302 are selected based on the potential state 535 for the aircraft 302 and a current state 312 for the aircraft 302 (operation 1402). In the operation 1402, the pilot may select the number of maneuvers at any point in time during the flight of the aircraft 302. Further, the number of maneuvers may be configured to be performed at a number of different points in time during the flight of the aircraft 302.

Referring again to the operation 1400, if the aircraft 302 is predicted to substantially maintain the desired height above the terrain 322 during the flight of the aircraft 302, the process terminates.

Next, the number of maneuvers selected for operating the aircraft 302 are performed during the flight of the aircraft 302 such that the aircraft 302 will substantially maintain the desired height above the terrain 322 if the potential state 535 for the aircraft 302 occurs (operation 1404), with the process terminating thereafter. For example, the number of maneuvers may include a series of maneuvers that, when performed, allow the aircraft 302 to substantially maintain the desired height above the terrain 322 even when the potential state 535 for the aircraft 302 occurs. Of course, depending on the implementation, the process illustrated in FIG. 14 may be performed periodically and/or continuously during the flight of the aircraft.

Turning now to FIG. 15, an illustration of a data processing system is depicted in accordance with an advantageous embodiment. In this illustrative example, a data processing system 1500 may be used in implementing the computer system 216 in the aircraft 200 in FIG. 2 and/or the computer system 308 in FIG. 3. As depicted, the data processing system 1500 includes a communications fabric 1502, which provides communications between a processor unit 1504, a memory 1506, a persistent storage 1508, a communications unit 1510, an input/output (I/O) unit 1512, and a display 1514.

The processor unit 1504 serves to execute instructions for software that may be loaded into the memory 1506. The processor unit 1504 may be a number of processors, a multiprocessor core, or some other type of processor, depending on the particular implementation. A number, as used herein with reference to an item, means one or more items. Further, the processor unit 1504 may be implemented using a number of heterogeneous processor systems in which a main processor is present with secondary processors on a single chip.

The memory 1506 and the persistent storage 1508 are examples of storage devices 1516. A storage device is any piece of hardware that is capable of storing information, such as, for example, without limitation, data, program code in functional form, and/or other suitable information either on a temporary basis and/or a permanent basis. The storage devices 1516 may also be referred to as computer readable storage devices in these examples. The memory 1506, in these examples, may be, for example, a random access memory or any other suitable volatile or non-volatile storage device. The persistent storage 1508 may take various forms, depending on the particular implementation.

For example, the persistent storage 1508 may contain one or more components or devices. For example, the persistent storage 1508 may be a hard drive, a flash memory, a rewritable optical disk, a rewritable magnetic tape, or some combination of the above. The media used by the persistent storage 1508 may also be removable. For example, a removable hard drive may be used for the persistent storage 1508.

The communications unit 1510, in these examples, provides for communications with other data processing systems or devices. In these examples, the communications unit 1510 is a network interface card. The communications unit 1510 may provide communications through the use of either or both physical and wireless communications links.

The input/output unit 1512 allows for input and output of data with other devices that may be connected to the data processing system 1500. For example, the input/output unit 1512 may provide a connection for user input through a keyboard, a mouse, and/or some other suitable input device. Further, the input/output unit 1512 may send output to a printer. The display 1514 provides a mechanism to display information to a user.

Instructions for the operating system, applications, and/or programs may be located in the storage devices 1516, which are in communication with the processor unit 1504 through the communications fabric 1502. In these illustrative examples, the instructions are in a functional form on the persistent storage 1508. These instructions may be loaded into the memory 1506 for execution by the processor unit 1504. The processes of the different advantageous embodiments may be performed by the processor unit 1504 using computer implemented instructions, which may be located in a memory, such as the memory 1506.

These instructions are referred to as program code, computer usable program code, or computer readable program code that may be read and executed by a processor in the processor unit 1504. The program code in the different advantageous embodiments may be embodied on different physical or computer readable storage media, such as the memory 1506 or the persistent storage 1508.

Program code 1518 is located in a functional form on a computer readable media 1520 that is selectively removable and may be loaded onto or transferred to the data processing system 1500 for execution by the processor unit 1504. The program code 1518 and the computer readable media 1520 form a computer program product 1522 in these examples. In one example, the computer readable media 1520 may be a computer readable storage media 1524 or a computer readable signal media 1526. The computer readable storage media 1524 may include, for example, an optical or magnetic disk that is inserted or placed into a drive or other device that is part of the persistent storage 1508 for transfer onto a storage device, such as a hard drive, that is part of the persistent storage 1508. The computer readable storage media 1524 may also take the form of a persistent storage, such as a hard drive, a thumb drive, or a flash memory, that is connected to the data processing system 1500.

Alternatively, the program code 1518 may be transferred to the data processing system 1500 using the computer readable signal media 1526. The computer readable signal media 1526 may be, for example, a propagated data signal containing the program code 1518. For example, the computer readable signal media 1526 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for the data processing system 1500 are not meant to provide architectural limitations to the manner in which different advantageous embodiments may be implemented. The different advantageous embodiments may be implemented in a data processing system including components in addition to or in place of those illustrated for the data processing system 1500.

Other components shown in FIG. 15 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, the processor unit 1504 may take the form of a hardware unit that has circuits that are manufactured or configured for a particular use. This type of hardware may perform operations without needing program code to be loaded into a memory from a storage device to be configured to perform the operations.

For example, when the processor unit 1504 takes the form of a hardware unit, the processor unit 1504 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations.

Examples of programmable logic devices include, for example, a programmable logic array, programmable array logic, a field programmable logic array, a field programmable gate array, and other suitable hardware devices. With this type of implementation, the program code 1518 may be omitted because the processes for the different advantageous embodiments are implemented in a hardware unit.

In still another illustrative example, the processor unit 1504 may be implemented using a combination of processors found in computers and hardware units. The processor unit 1504 may have a number of hardware units and a number of processors that are configured to run the program code 1518. With this depicted example, some of the processes may be implemented in the number of hardware units, while other processes may be implemented in the number of processors.

In another example, a bus system may be used to implement the communications fabric 1502 and may be comprised of one or more buses, such as a system bus or an input/output bus. Of course, the bus system may be implemented using any suitable type of architecture that provides for a transfer of data between different components or devices attached to the bus system.

Thus, the different advantageous embodiments provide a method and apparatus for presenting pilots with an awareness of their vertical situation. The information may be provided on a continual basis to show a comparison of the energy state and climb capability of the aircraft with respect to terrain that is ahead of the aircraft. In one or more advantageous embodiments, a vertical profile view of the terrain is displayed relative to a location of an aircraft. A number of curves on the vertical profile view are displayed. The number of curves identify a climb capability for the aircraft based on the state of the aircraft.

Further, the different advantageous embodiments provide a method and apparatus for presenting information to operate an aircraft over terrain based on potential states for the aircraft. A vertical profile view of the terrain is displayed relative to a location of the aircraft. A number of curves are displayed on the vertical profile view. The number of curves identify a number of maximum heights of the terrain that the aircraft can clear based on a potential state for the aircraft.

The different advantageous embodiments provide a terrain information system that allows pilots of aircraft to have terrain information with respect to their vertical situation during flight that is continuously updated. The type of system allows the pilot to more accurately maneuver over the terrain during flight, as compared to currently used systems. Further, this type of system reduces the amount of guesswork and/or estimation involved in a pilot maneuvering over terrain. The terrain information system described in these advantageous embodiments also helps the pilots determine which terrain points are the most critical for the aircraft to clear.

What is claimed is:

1. A method for presenting information to operate an aircraft over terrain, the method comprising:
   displaying a vertical profile view of the terrain relative to a location of the aircraft; and displaying a number of curves on the vertical profile view, wherein the number of curves identify a climb capability of the aircraft based on a potential state for the aircraft.

2. The method of claim 1, wherein the number of curves are a number of potential climb capability curves and identify a first number of maximum heights of the terrain that the aircraft can clear based on the potential state for the aircraft and further comprising:

displaying a number of current climb capability curves on the vertical profile view, wherein the number of current climb capability curves identify a second number of maximum heights of the terrain that the aircraft can clear based on a current state of the aircraft.

3. The method of claim 1, wherein the step of displaying the number of curves on the vertical profile view comprises:

displaying a curve on the vertical profile view, wherein the curve identifies a number of maximum heights of the terrain that the aircraft can clear by climbing and then changing to a substantially level flight, wherein the curve is based on the potential state of the aircraft, a minimum clearance height, and a desired safety margin.

4. The method of claim 3, wherein the curve is a first curve and the number of maximum heights are a first number of maximum heights and wherein the step of displaying the number of curves on the vertical profile view further comprises:

displaying a second curve on the vertical profile view, wherein the second curve identifies a second number of maximum heights of the terrain that the aircraft can clear by climbing without taking into account whether the aircraft can change to the substantially level flight and wherein the second curve is based on the potential state of the aircraft, the minimum clearance height, and a safety margin less than the desired safety margin.

5. The method of claim 4, wherein a first portion of the first curve overlaps with a second portion of the second curve.

6. The method of claim 3 further comprising:

responsive to a portion of the terrain being above the curve, generating an alert indicating that the aircraft cannot clear the terrain for the potential state for the aircraft.

7. The method of claim 1 further comprising:

determining whether the aircraft is predicted to substantially maintain a desired height above the terrain during a flight of the aircraft based on the climb capability of the aircraft if the aircraft is in the potential state; and selecting a number of maneuvers for operating the aircraft based on a current state for the aircraft and the climb capability for the aircraft if the aircraft is in the potential state when the aircraft is not predicted to substantially maintain the desired height above the terrain during the flight of the aircraft.

8. The method of claim 2, wherein the number of potential climb capability curves are displayed using a first number of graphical indicators and the number of current climb capability curves are displayed using a second number of graphical indicators in which the first number of graphical indicators are different from the second number of graphical indicators.

9. The method of claim 8, wherein a first graphical indicator for a curve in the number of potential climb capability curves is selected from at least one of a first color and a first pattern for the curve in the first number of curves and a second graphical indicator for a curve in the number of current climb capability curves is selected from at least one of a second color and a second pattern for the curve in the second number of curves.

10. The method of claim 1, wherein the potential state for the aircraft comprises at least one of a change in a flight plan, dropping cargo at an unplanned location, not dropping the cargo at a planned location, an unplanned change in a configuration for control surfaces for the aircraft, and a loss of an engine.

11. A method for operating an aircraft over terrain, the method comprising:

determining whether the aircraft is predicted to substantially maintain a desired height above the terrain during a flight of the aircraft using a vertical profile view of the terrain and a number of curves displayed on the vertical profile view; and selecting a number of maneuvers for operating the aircraft based on the potential state for the aircraft and a current state for the aircraft when the aircraft is not predicted to substantially maintain the desired height above the terrain during the flight of the aircraft.

12. The method of claim 11 further comprising:

performing the number of maneuvers selected for operating the aircraft during the flight of the aircraft such that the aircraft will substantially maintain the desired height above the terrain if the potential state for the aircraft occurs.

13. An apparatus comprising:

a display device;
a storage device;
program code stored on the storage device; and
a processor unit configured to run the program code to display a vertical profile view of terrain relative to a location of an aircraft; and display a number of curves on the vertical profile view, wherein the number of curves identify a climb capability of the aircraft based on a potential state for the aircraft.

14. The apparatus of claim 13, wherein the number of curves are a number of potential climb capability curves and identify a first number of maximum heights of the terrain that the aircraft can clear based on the potential state of the aircraft and wherein the processor unit is further configured to run the program code to display a number of current climb capability curves on the vertical profile view, wherein the number of current climb capability curves identify a second number of maximum heights of the terrain that the aircraft can clear based on a current state of the aircraft.

15. The apparatus of claim 13, wherein in being configured to run the program code to display the number of curves on the vertical profile view, the processor unit is configured to run the program code to display a curve on the vertical profile view, wherein the curve identifies a number of maximum heights of the terrain that the aircraft can clear by climbing and then changing to a substantially level flight, wherein the curve is based on the potential state of the aircraft, a minimum clearance height, and a desired safety margin.

16. The apparatus of claim 15, wherein the curve is a first curve and the number of maximum heights are a first number of maximum heights and wherein in being configured to run the program code to display the number of curves on the vertical profile view, the processor unit is further configured to run the program code to display a second curve on the vertical profile view, wherein the second curve identifies a second number of maximum heights of the terrain that the aircraft can clear by climbing without taking into account whether the aircraft can change to the substantially level flight and wherein the second curve is based on the potential state for the aircraft, the minimum clearance height, and a safety margin less than the desired safety margin.

17. The apparatus of claim 15, wherein the processor unit is further configured to run the program code to generate an alert indicating that the aircraft cannot clear the terrain for the potential state for the aircraft in response to a portion of the terrain being above the curve.

18. The apparatus of claim 17, wherein the potential state for the aircraft comprises at least one of a change in a flight plan, dropping cargo at an unplanned location, not dropping the cargo at a planned location, an unplanned change in a configuration for control surfaces for the aircraft, and a loss of an engine.

19. The apparatus of claim 14, wherein the number of potential climb capability curves are displayed using a first number of graphical indicators and the number of current climb capability curves are displayed using a second number of graphical indicators in which the first number of graphical indicators are different from the second number of graphical indicators.

20. The apparatus of claim 19, wherein a first graphical indicator for a curve in the number of potential climb capability curves is selected from at least one of a first color and a first pattern for the curve in the first number of curves and a second graphical indicator for a curve in the number of current climb capability curves is selected from at least one of a second color and a second pattern for the curve in the second number of curves.

\* \* \* \* \*